(12) United States Patent
Fiedler

(10) Patent No.: US 9,898,175 B2
(45) Date of Patent: Feb. 20, 2018

(54) HOME NETWORK MANAGER FOR HOME AUTOMATION

(71) Applicant: Fibar Group sp. z o.o., Poznań (PL)

(72) Inventor: Maciej Fiedler, Poznań (PL)

(73) Assignee: Fibar Group S.A. (PL)

( * ) Notice: Subject to any disclaimer, the term of this patent is extended or adjusted under 35 U.S.C. 154(b) by 0 days.

(21) Appl. No.: 14/451,941

(22) Filed: Aug. 5, 2014

(65) Prior Publication Data
US 2016/0043905 A1 Feb. 11, 2016

(51) Int. Cl.
| G06F 3/048 | (2013.01) |
| G06F 3/0484 | (2013.01) |
| G06F 3/0482 | (2013.01) |
| G08B 25/14 | (2006.01) |
| H04L 12/28 | (2006.01) |

(52) U.S. Cl.
CPC ........ *G06F 3/04842* (2013.01); *G06F 3/0482* (2013.01); *G08B 25/14* (2013.01); *H04L 12/28* (2013.01)

(58) Field of Classification Search
CPC ....................................................... G06F 3/048
USPC ....................................................... 715/736
See application file for complete search history.

(56) References Cited

U.S. PATENT DOCUMENTS

| 3,873,927 A | 3/1975 | Overall |
| D301,869 S | 6/1989 | Schwartz |
| D325,902 S | 5/1992 | Hudson et al. |
| D334,561 S | 4/1993 | Crater et al. |
| D349,687 S | 8/1994 | Khoo et al. |
| D359,043 S | 6/1995 | Althans |

(Continued)

FOREIGN PATENT DOCUMENTS

| CA | 70745 | 6/1992 |
| CA | 74034 | 3/1994 |

(Continued)

OTHER PUBLICATIONS

Automated Home, Case Study: UK Z-Wayne Home Automation Setup, www.automatedhome.co.uk/installation.case-study-uk-z-wave-home-automation-setup.html (13 pages), Jun. 17, 2014.

(Continued)

*Primary Examiner* — Xuyang Xia
(74) *Attorney, Agent, or Firm* — McAndrews, Held & Malloy, Ltd.

(57) ABSTRACT

A method and/or system of managing a plurality of elements of a premise having a plurality of areas via an electronic management interface. The method and/or system includes grouping via the electronic management interface a number of said elements consuming one or more commodity within said areas, and displaying via the electronic management interface a list of said areas. The method and/or system also includes selecting via the electronic management interface one or more of said areas from said displayed list, monitoring via the electronic management interface commodity data indicative of commodity consumed by said number of elements within said selected one or more areas, displaying via the electronic management interface a plurality of visualization modes of said monitored data, and displaying via the electronic management interface said monitored data based on one or more of said visualization modes.

8 Claims, 20 Drawing Sheets

(56) References Cited

U.S. PATENT DOCUMENTS

| | | | |
|---|---|---|---|
| D381,633 S | 7/1997 | Hiyakumoto et al. |
| D396,471 S | 7/1998 | Kolinen |
| D402,909 S | 12/1998 | Stanuch |
| D405,424 S | 2/1999 | Winkler et al. |
| D417,871 S | 12/1999 | Hisatsune |
| D481,056 S | 10/2003 | Kawasaki et al. |
| D487,728 S | 3/2004 | Murray |
| D489,337 S | 5/2004 | Murray |
| D492,262 S | 6/2004 | Murray |
| D494,583 S | 8/2004 | Guerrera |
| 6,892,751 B2 | 5/2005 | Sanders |
| D513,497 S | 1/2006 | Whitehouse |
| D514,118 S | 1/2006 | Christianson |
| D520,500 S | 5/2006 | Storti et al. |
| D521,403 S | 5/2006 | Shain et al. |
| D523,873 S | 6/2006 | Huang |
| D533,186 S | 12/2006 | Chen et al. |
| D533,851 S | 12/2006 | Yoon |
| D540,752 S | 4/2007 | Hayes et al. |
| 7,206,645 B2 | 4/2007 | Seguin |
| D541,762 S | 5/2007 | Nakagawa et al. |
| D548,702 S | 8/2007 | Girard |
| 7,253,741 B2 | 8/2007 | Fiorletta et al. |
| 7,309,216 B1 | 12/2007 | Spadola, Jr. et al. |
| D559,233 S | 1/2008 | Tang |
| D567,187 S | 4/2008 | Oba et al. |
| D570,297 S | 6/2008 | Gibbons et al. |
| D588,484 S | 3/2009 | Bandringa et al. |
| D604,254 S | 11/2009 | Lanfear et al. |
| D604,725 S | 11/2009 | Chen |
| D609,701 S | 2/2010 | Hou |
| D610,479 S | 2/2010 | Shi |
| D621,287 S | 8/2010 | Kaneko et al. |
| D631,165 S | 1/2011 | Fisher et al. |
| D631,446 S | 1/2011 | Lanfear et al. |
| D638,372 S | 5/2011 | Clymer et al. |
| D639,752 S | 6/2011 | Li et al. |
| D646,640 S | 10/2011 | Clymer et al. |
| D647,504 S | 10/2011 | Choi |
| 8,154,398 B2 | 4/2012 | Rolf et al. |
| D660,261 S | 5/2012 | Huang et al. |
| D660,809 S | 5/2012 | Kern Koskela et al. |
| D664,460 S | 7/2012 | Aurongzeb et al. |
| D665,290 S | 8/2012 | Bhate et al. |
| D665,773 S | 8/2012 | Behringer |
| D671,851 S | 12/2012 | Treharne et al. |
| D678,097 S | 3/2013 | Elwell et al. |
| D678,258 S | 3/2013 | Seto |
| D680,015 S | 4/2013 | Hauser et al. |
| D682,777 S | 5/2013 | Gupta et al. |
| D683,251 S | 5/2013 | Dumas et al. |
| D689,441 S | 9/2013 | Kah, Jr. et al. |
| D692,332 S | 10/2013 | Ni et al. |
| D693,311 S | 11/2013 | Biller et al. |
| D695,234 S | 12/2013 | Santiago |
| D695,693 S | 12/2013 | Lee et al. |
| D699,177 S | 2/2014 | Higashi |
| D703,156 S | 4/2014 | Parsons et al. |
| D703,566 S | 4/2014 | Chen et al. |
| D704,625 S | 5/2014 | Tsutsumi et al. |
| D705,719 S | 5/2014 | Wong |
| D706,152 S | 6/2014 | Ni et al. |
| D706,228 S | 6/2014 | Ishiura |
| 8,836,522 B2 | 9/2014 | Thorpe et al. |
| 2008/0133063 A1 | 6/2008 | Bisson et al. |
| 2009/0231129 A1 | 9/2009 | Edwards et al. |
| 2009/0240377 A1 | 9/2009 | Batzler et al. |
| 2010/0141602 A1* | 6/2010 | Duchene ............. G05B 19/042 345/173 |
| 2010/0289643 A1* | 11/2010 | Trundle ............. F24F 11/0086 340/545.1 |
| 2011/0012726 A1 | 1/2011 | Jessiman et al. |
| 2011/0061014 A1* | 3/2011 | Frader-Thompson et al. ............. 715/771 |
| 2011/0093217 A1 | 4/2011 | Kates |
| 2011/0130880 A1* | 6/2011 | Nishino et al. ............. 700/276 |
| 2011/0289561 A1 | 11/2011 | Ivanov et al. |
| 2012/0130513 A1* | 5/2012 | Hao ............. G05B 15/02 700/90 |
| 2013/0082835 A1 | 4/2013 | Shapiro et al. |
| 2013/0145826 A1 | 6/2013 | Richarz et al. |
| 2013/0241479 A1 | 9/2013 | Wright, Jr. et al. |
| 2014/0005809 A1* | 1/2014 | Frei et al. ............. 700/90 |
| 2014/0167929 A1* | 6/2014 | Shim ............. G08C 17/02 340/12.5 |
| 2014/0218517 A1* | 8/2014 | Kim ............. H04L 12/2818 348/143 |
| 2014/0351182 A1* | 11/2014 | Canoy et al. ............. 706/12 |
| 2015/0052469 A1* | 2/2015 | Dharmalingam ... G06F 3/04842 715/771 |

FOREIGN PATENT DOCUMENTS

| | | |
|---|---|---|
| CA | 74569 | 8/1994 |
| CA | 74610 | 8/1994 |
| CN | 3274285 | 1/2003 |
| CN | 301936325 S | 5/2012 |
| CN | 201230432179 | 6/2013 |
| CN | 302767627 S | 3/2014 |
| DE | 4029615 A1 | 4/1992 |
| EP | 0241676 A2 | 10/1987 |
| EP | 000137351-0008 | 2/2004 |
| EP | 000145644-0001 | 3/2004 |
| EP | 000166350-0001 | 4/2004 |
| EP | 000242888-0001 | 10/2004 |
| EP | 000253380-0002 | 11/2004 |
| EP | 000268032-0002 | 12/2004 |
| EP | 000321971-0007 | 4/2005 |
| EP | 000352943-0001 | 6/2005 |
| EP | 000481304-0001 | 2/2006 |
| EP | 000536438-0001 | 5/2006 |
| EP | 000603709-0002 | 10/2006 |
| EP | 000623608-0001 | 11/2006 |
| EP | 000757620-0004 | 7/2007 |
| EP | 000779061-0001 | 8/2007 |
| EP | 000792791-0001 | 9/2007 |
| EP | 000827118-0001 | 11/2007 |
| EP | 000830542-0006 | 11/2007 |
| EP | 000883269-0001 | 2/2008 |
| EP | 001015788-0001 | 10/2008 |
| EP | 001032437-0001 | 11/2008 |
| EP | 001032437-0002 | 11/2008 |
| EP | 001057392-0001 | 12/2008 |
| EP | 001223457-0002 | 6/2010 |
| EP | 001720590-0001 | 6/2010 |
| EP | 001781188-0001 | 11/2010 |
| EP | 001259204-0001 | 2/2011 |
| EP | 001828070-0001 | 2/2011 |
| EP | 001295182-0001 | 9/2011 |
| EP | 001914029-0004 | 9/2011 |
| EP | 001920018-0004 | 9/2011 |
| EP | 002041764-0001 | 5/2012 |
| EP | 002074989-0001 | 7/2012 |
| EP | 002079673-0001 | 7/2012 |
| EP | 002143784-0002 | 11/2012 |
| EP | 002163360-0001 | 1/2013 |
| EP | 002177667-0001 | 2/2013 |
| EP | 002242800-0001 | 5/2013 |
| EP | 002278887-0001 | 7/2013 |
| EP | 002293415-0002 | 8/2013 |
| EP | 002440198-0001 | 4/2014 |
| EP | 002465476-0002 | 5/2014 |
| JP | 1177905 S | 6/2003 |
| JP | 1203574 S | 4/2004 |
| JP | 1220720 S | 10/2004 |
| JP | 1333401 S | 6/2008 |
| JP | 1348157 S | 1/2009 |
| JP | 1400836 S | 11/2010 |
| JP | 1422635 S | 9/2011 |
| JP | 1463123 S | 2/2013 |
| JP | 1491697 S | 3/2013 |
| JP | 1386160 S | 4/2013 |
| JP | 1471658 S | 6/2013 |

(56) References Cited

FOREIGN PATENT DOCUMENTS

| | | |
|---|---|---|
| JP | 1475417 S | 7/2013 |
| JP | 1477025 S | 8/2013 |
| JP | 1477336 S | 8/2013 |
| JP | 1400674 S | 10/2013 |
| JP | 1498774 S | 6/2014 |
| WO | DM053972 | 11/2000 |
| WO | DM/058681 | 11/2001 |
| WO | DM059634 | 3/2002 |
| WO | DM066764 | 5/2005 |
| WO | DM/074389 | 9/2010 |
| WO | DM074708 | 11/2010 |
| WO | DM075611 | 12/2010 |
| WO | DM075517 | 2/2011 |
| WO | DM076583 | 5/2011 |
| WO | DM078408 | 11/2011 |
| WO | DM079061 | 2/2012 |
| WO | DM078643 | 6/2012 |
| WO | DM078737 | 7/2012 |
| WO | DM079877 | 12/2012 |
| WO | DM081654 | 8/2013 |
| WO | DM082066 | 10/2013 |
| WO | DM083551 | 2/2014 |

OTHER PUBLICATIONS

The Online Architecture and Design Exhibition, Interface Module for Home Automation System—EXB-REL8—AMX—Videos, www.archiexpo.com/prod/amx/interface-module-home-automation-systems-51274-1065061.html (18 pages), Jun. 17, 2014.

Graves on SOHO Technology, Vera Home Automation, Michael Graves, Oct. 23, 2008, www.mgraves.org/2008/10/vera-home-automation/ (6 pages), Jun. 17, 2014.

TaHomA—Home Motion by Somfy, Somfy Systems, Creator of TaHomA, the New Home Control System, www.somfytahoma.com/home-automation-products/home-automation-controllers-products/home-automation-somfy--tahoma-controller (3 pages), Jun. 17, 2014.

Introduction to X10 Home Automation Technology, by Tony Northrup, Jan. 10, 2005, www.oreillynet.com/pub/a/network/2005/01/10/x10_hmhck.html (5 pages), Jun. 17, 2014.

Fibaro Flood Sensor URL: http://www.fibaro.com/en/the-fibaro-system/flood-sensor.

Wireless Leakage Sensor URL: http://smarthome01.com/2014/03/03/wireless-leakage-sensor/.

Occupancy Sensor URL: http://www.tech-faq.com/occupancy-sensors.html.

\* cited by examiner

HOME NETWORK MANAGER FOR HOME AUTOMATION

TECHNICAL FIELD

Aspects of the present disclosure relate to electronic systems and/or networking. More specifically, certain implementations of the present disclosure relate to a method and a system of operating a home network manager for home automation.

BACKGROUND

Existing methods and systems for providing device monitoring or control may be costly, cumbersome and inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for a home center manager user-interface, substantially as shown in and/or described in connection with at least one of the figures, as set forth more completely in the disclosure and/or the claims.

In one embodiment, the disclosure provides a method of managing a plurality of elements of a premise having a plurality of areas via an electronic management interface. The method includes grouping via the electronic management interface a number of said elements consuming one or more commodity within said areas, and displaying via the electronic management interface a list of said areas. The method also includes selecting via the electronic management interface one or more of said areas from said displayed list, monitoring via the electronic management interface commodity data indicative of commodity consumed by said number of elements within said selected one or more areas, displaying via the electronic management interface a plurality of visualization modes of said monitored data, and displaying via the electronic management interface said monitored data based on one or more of said visualization modes.

In another embodiment, the disclosure provides a method of managing a plurality of elements of a premise having a plurality of areas via an electronic management interface. The method includes grouping via the electronic management interface a first number of said elements within said areas, and displaying via the electronic management interface one or more of said groups of elements. The method also includes configuring via the electronic management interface one or more actions associated with a second number of said elements based on one or more conditions of said displayed one or more groups of elements, monitoring via the electronic management interface said one or more conditions of said one or more of said groups of elements, and activating via the electronic management interface said second number of said elements to perform said one or more actions based on said monitored one or more conditions.

In yet another embodiment, the disclosure provides a method of managing a plurality of elements of a premise having a plurality of areas via an electronic management interface. The method includes grouping via the electronic management interface said elements within said areas, and displaying via the electronic management interface a first group of said elements and a list of actions associated with a second group of said elements. The method also includes selecting via the electronic management interface one or more actions from said list of actions associated with said second group of said elements, monitoring via the electronic management interface one or more conditions of said first group of said elements, and initiating via the electronic management interface, in response to said monitored one or more conditions being met, said one or more selected actions associated said second group of said elements.

In still another embodiment, the disclosure provides a system for managing commodity consumed within a premise having a plurality of areas. The system includes a plurality of elements to consume one or more commodity within the areas, and to report data indicative of the commodity consumed. An electronic manager groups a number of the elements, and to receive the data indicative of the commodity consumed. A display of the system displays a list of the areas in which the elements are located. The system also includes an interface to receive a selection of one or more of the areas from the displayed list. The display also displays a plurality of visualization modes, and the received data of the selected one or more of the areas based on one or more of the visualization modes.

These and other advantages, aspects and novel features of the present disclosure, as well as details of illustrated implementation(s) thereof, will be more fully understood from the following description and drawings.

DETAILED DESCRIPTION

Certain implementations may be found in a method and system for operating a home network manager for home automation. As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and/or "module" refer to functions than may be performed by one or more circuits. As utilized herein, the term "example" means serving as a non-limiting example, instance, or illustration. As utilized herein, the terms "for example" and "e.g." introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
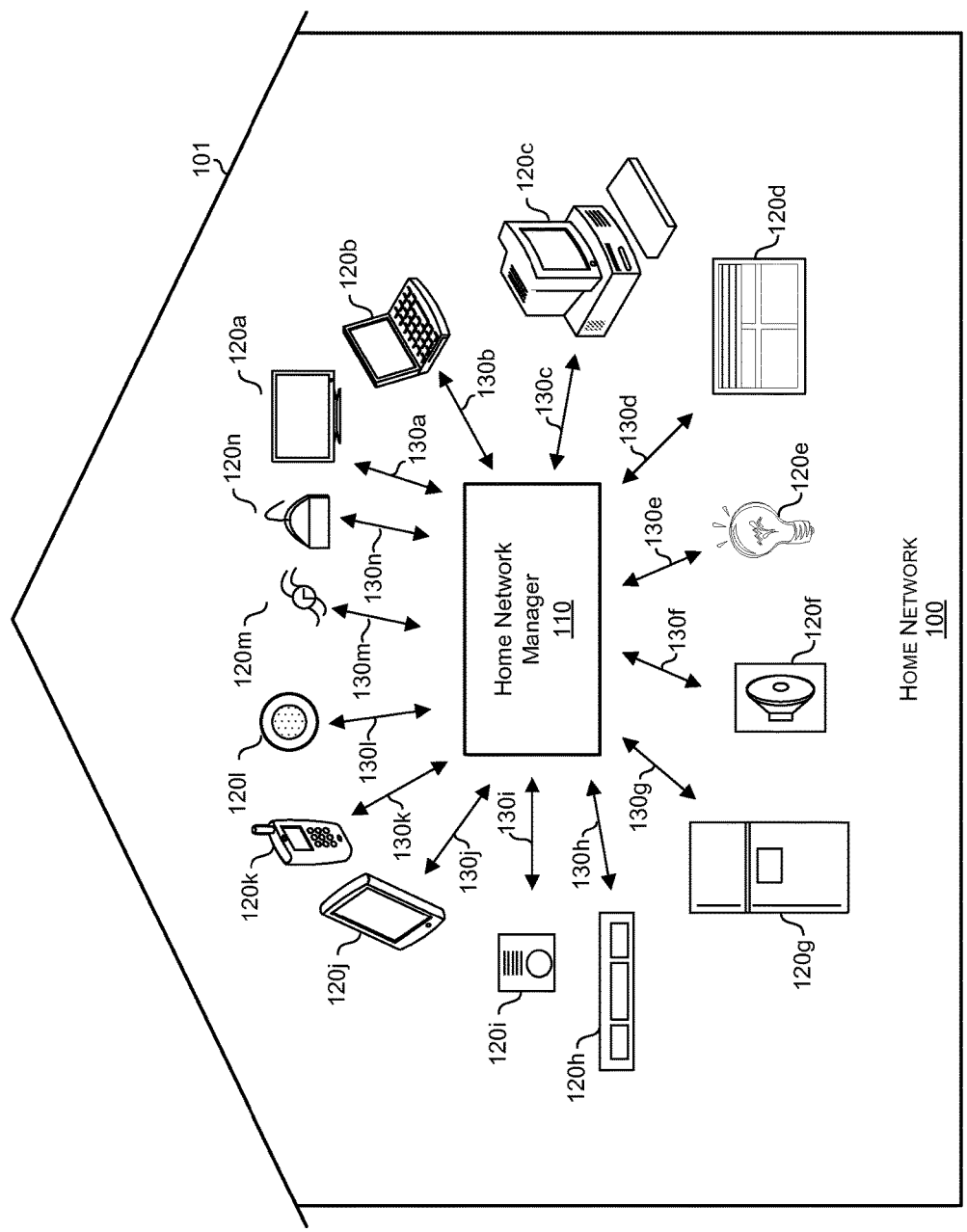
FIG. 1 illustrates an example home network.

FIG. 1 illustrates an example home network. Referring to FIG. 1, there is shown a home network 100.

The home network 100 may correspond to a location 101. The location 101 may, for example, correspond to a residence (e.g., home, apartment) or non-residence premises (e.g., small business, school, library, factory). In this regard, the home network 100 may, for example, comprise a plurality of home network elements, such as, for example, a plurality of home network elements 120a-120n. The home network elements (e.g., home network elements 120a-120n) may, for example, comprise one or more devices, systems, fixtures, appliances, and/or other circuitry. The home network elements (e.g., home network elements 120a-120n) may comprise, for example, one or more televisions 120a, one or more computers (e.g., laptop computer 120b, desktop computer 120c), one or more personal and/or handheld devices (e.g., tablet 120j, mobile phone 120k, smart watch 120m), one or more multimedia devices and/or components (e.g., speakers 120f), one or more structural fixtures (e.g., windows/window blinds 120d), one or more lighting and/or electrical fixtures 120e, one or more appliances (e.g., refrigerator 120g), one or more environmental sensory devices 120h (e.g., thermometers, humidity meters), one or more security devices 120i (e.g., a smoke detector, a carbon monoxide detector, a security alarm, a motion detector), and/or one or more sensors and/or controller (e.g., intelligent motion sensor 120l, RGBW controller 120n) and/or other devices.

The disclosure is not limited to any particular type of a home network. Furthermore, the disclosure is not limited to any particular combination of home network elements. It is to be understood that although the network is referred to as a "home network" throughout the disclosure, the disclosure is not limited in this way. Specifically, the network may comprise any other network that may be operable to control one or more network elements. For example, the network of the disclosure (whether or not referred to as a "home network") may be implemented in a residential, non-residential, commercial, industrial and/or any other setting. Similarly, the network elements may comprise network elements (whether or not referred to as a "home network elements") implemented in a residential, non-residential, commercial, industrial and/or any other setting.

In some instances, the home network 100 may incorporate a home network manager 110. The home network manager 110 may comprise suitable circuitry, interfaces, logic, and/or code for implementing various aspects of the present disclosure. For example, the home network manager 110 may be configured for use in managing, servicing, and/or interacting with one or more home network elements. Although the home network manager 110 is shown in FIG. 1 as a single and separate device, the disclosure is not limited in this way. For example, in some implementations, one or more functions of the home network manager 110 may be provided by one or more home network elements (e.g., providing user interface via tablet 120j and/or television 120a). In an example embodiment of the disclosure, the home network manager 110 may be implemented as a virtual platform, such as, for example, one or more software modules, and may run on, and/or utilize resources of one or more home network elements (e.g., laptop 120b, desktop 120c).

The home network manager 110 may be configured to communicate with one or more elements (e.g., home network devices, home network elements) in a home network. In an example embodiment of the disclosure, the home network manager 110 may be operable to communicate with one or more devices and/or systems that may be external to a home network, using, for example, optical, wired and/or wireless communication links.

Although the home network manager 110 is illustrated as a single device, the disclosure is not limited in this way. For example, the home network manager may comprise one or more home network manager that may each interact with one or more home network elements (e.g., home network elements 120a-120n). In an example embodiment of the disclosure, each of the one or more home network managers may be associated with particular one or more home network elements. In another example, one or more of the one or more home network managers may be associated with any one or more home network elements (e.g., home network elements within range of a particular home network manager, with best communication path).

In an example embodiment of the disclosure, the home network manager 110 may be implemented in an integrated or a distributed system. An integrated system may be implemented, for example, on one computer, server, machine or device, where the integrated system may be configured to perform some or all of the functions, features and/or operations of the home network manager 110 as described herein. A distributed system may be implemented with multiple components (e.g., computers, servers, machines and/or devices), where each of the multiple components may be configured to perform some or all of the functions, features and/or operations of the home network manager 110 as described herein. Each function, feature and/or operation may be implemented on one or more of the components of the distributed system. For example, a specific feature, function and/or operation may be implemented only one component of the distributed system or it may be implemented across multiple components of the distributed system.

In an example embodiment of the disclosure, in addition to or instead of the use of one or more home network managers, the home network 100 may comprise one or more master controllers for controlling one or more home network elements. A master controller may be preprogrammed and/or programmable to control one or more home network elements. A master controller may comprise, for example, a remote controller.

Although the disclosure may refer to a single home network manager, it is to be understood that the disclosure is not limited in this way. For example, the home network manager may comprise one or more home network managers that individually and/or in the aggregate may be implemented as integrated and/or a distributed system.

The home network manager 110 may interact with one or more of the home network elements 120a-120n via corresponding links 130a-130n, which may be supported by the home network manager 110 and/or the corresponding home network element(s). For example, the links 130a-130n may be implemented and/or configured to operate using a wireless protocol, such as, for example, a Z-wave protocol. In an example embodiment of the disclosure, the home network 100 may be implemented as Z-Wave network. However, the disclosure is not limited in this way. For example, the home network 110 may comprise one or more wired and/or wireless links and/or protocol. Wireless links and/or protocols, may comprise, for example, WPAN (e.g., Bluetooth or ZigBee), low power links (e.g., Bluetooth LE (BLE), Bluetooth Smart, iBeacon), near field communication protocols (e.g., NFC) and/or WLAN (WiFi/802.11) protocols and/or any other wireless links and/or protocols suitable for implementation consistent with the disclosure. Wired protocols and/or links may comprise, for example, Ethernet, Universal Serial Bus (USB), and/or any other wired links and/or protocols suitable for implementation consistent with the disclosure.

In an example embodiment of the disclosure, home network manager 110 may interact with one or more home network elements (e.g., home network elements) directly and/or indirectly. For example, the home network manager 110 may interact with one or more home network elements directly through a corresponding link (e.g., wireless, wired link/connection).

In another example, the home network manager 110 may interact with one or more home network elements indirectly though, for example, a converter (e.g., global cache.) In this regard, the home network manager 110 that supports one or more particular network interfaces and/or other interfaces (e.g., USB) may be operable to interact with a particular network element (and/or another device) that may otherwise be incompatible with one or more of the one or more particular network and/or other interfaces supported by the home network manger 110. The interaction may be achieved through, for example, a converter and/or a translator. The converter and/or the translator may each comprise suitable logic, circuitry, interfaces, and/or code that may be operable to facilitate communication between a home network manager (e.g., the home network manger 110) and a home network element (home network elements 120a-120n).

In another example, the home network manager 110 may interact with one or more home network elements indirectly though, for example, other network elements. In this regard, the home network manager 110 may interact with one or more home network elements on, for example, a mesh network. An example mesh network (not shown) may facilitate communication (e.g., transmission of messages, signals, data frames) to and/or from the home network manager (e.g., the home network manager 110) to and/or from a particular network element where the communication may, for example, pass through one or more other network elements before reaching the particular network element and/or the home network manager.

In an example embodiment of the disclosure, the home network manager 110 may be operable to support one or more communication methods from one or more other home network devices (e.g., home network elements 120a-120n). For example, one or more home network elements may communicate with the home network manager 110 utilizing a particular wireless link and/or protocol (e.g., Z-wave) and/or a particular wired link and/or protocol (e.g., Ethernet), while one or more other home network elements may communicate with the home network manager 110 utilizing a different particular wireless link and/or protocol (e.g., WiFi) and/or a different particular wired link and/or protocol (e.g., USB).

In an example embodiment of the disclosure, the same one or more home network elements may communicate with the home network manager 110 by, for example, using one or more wired and/or wireless links and/or protocols at the same and/or at different times. For example, a particular network element may communicate with the home network manager 110 using a Z-Wave communication protocol for a particular communication and may communicate with the home network manager 110 using a WiFi communication protocol for another particular communication.

In an example embodiment of the disclosure, one or more home network elements (e.g., home network elements 120a-120n) may communicate with one or more home network elements (e.g., home network elements 120a-120n) directly. In this regard, the one or more network elements may utilize one or more communication links (e.g., wireless, wired) (not shown) and/or one or more network interfaces and/or other interfaces without directing (e.g., routing the communication thought, for example, a home network manager (e.g., the home network manger 110). For example, a home network element may be operable to detect existence of one or more other network elements (e.g., on the same and/or different network) and may initiate, send and/or receive communication to and/or from the one or more other network elements.

In an example embodiment of the disclosure, one network element may be out of range of a home network manager and may communicate with one or more other network elements to determine whether the one or more other network elements are within range of a particular (e.g., a home network manager previously within range of the one network element) and/or any network manager. The range detection and/or discovery may continue from one network element to another. For example, a particular home network element may need to communicate through more than one other home network element in order to, for example, communicate with a desired home network element and/or a desired, particular and/or any home network manager (e.g., the home network manager 110). The disclosure is not limited to a communication for a purpose of range discovery/detection. The communication may comprise any type of communication and may be used for a variety of other purposes (e.g., communicating with a different network element, communicating with a home network manager, controlling an out of range device, controlling another network element).

In an example embodiment of the disclosure, one or more home network elements (e.g., home networks elements 120a-120n) may be operable to control one or more other home network elements (e.g., home networks elements 120a-120n) with and/or without intermediary, such as, for example, a home network manager (e.g., home network manager). For example, one or more home network elements may be operable to control one or more other home network elements through an intermediary. In this regard, a particular network element may communicate with an intermediary (e.g., home network manager) in order to communicate with and/or to control another home networks element. An intermediary may comprise one or more devices (e.g., a preprogrammed and/or programmable master controller, home network manager) that may be operable to control one or more network elements. In another example, a particular network element may directly communicate with and/or to control another home networks element.

In an example embodiment of the disclosure, one or more home network elements (e.g. home network elements 120a-120n) and/or other devices that may be operable to communicate on the network (and/or an associated network as described herewith) and/or that may not be operable to communicate on the network but may otherwise be tractable (e.g., GPS, iBeacon, electronic tag), with one or more other network elements, devices and/or a network manager (e.g., home network manager 110) associated with a particular network (e.g., home network 100) (and/or an associated network as described herewith), may communicate with each other, other devices (e.g., on the same network, another network and/or otherwise connected and/or tractable) and/or the network manager, and/or may be operable to determine a precise location of a particular network element, device and/or network manager utilizing various communication protocols and/or interfaces.

For example, one or more network elements (and/or other devices operable on the network, an associated network as described herewith and/or otherwise traceable) may be operable to generate and/or receive information and/or one more signals and/or messages that may be utilized in determining a location of a particular network element, device and/or network manager. In this regard, a near field communication and/or a low power interface protocol (e.g., BLE, iBeacon) may be utilized for communication between the elements, devices and/or network managers. Furthermore, one more tags (e.g., small electronic devices) may be utilized, to facilitate location of particular elements, devices and/or network managers. For example, a network element, device and/or home network manager may generate a signal and/or a message (on the network, on an associated network and/or through a built in, external, portable and/or otherwise attachable tag) that may be received by another network element, device and/or network manager.

In an example embodiment of the disclosure, one or more home network elements, devices and/or manager may cooperate (e.g., exchange information) to, for example, collectively and/or individually determine a precise location of a particular network elements, device and/or network manager based on the received one or more signals and/or messages. As an example only, a particular network element, device and/or home network manager may generate a signal and/or a message that may be received by other network element, device and/or home network device within a particular time frame. The information about the time it took to, for example, receive the particular one or more signals and/or messages (and/or the information gather from the one or more signals and/or messages, such as, for example, signal strength) may be used to determine the precise location (e.g., distance to/from the network element, device, network manager that received the particular one or more signals and/or message) of the particular network element, device and/or network manager.

In operation, the home network manager 110 may be operable to manage a home network (e.g., the home network 100). The home network manager 110 may be utilized, for example, as an interface platform for interacting with various network elements (e.g., the home network elements 120a-120n). In this regard, the home network manager 110 may support establishing and/or configuring one or more communication connections/links (e.g., the links 130a-130n) with the one or more elements of the home network 110. Once established, the connectivity between the home network manager 110 and the home network elements (e.g., elements 120a-120n) may, for example, be utilized to enable centralized monitoring, control, and/or management of the home network elements, and/or of the home network 100 as a whole. For example, the home network manager 110 may be operable to control operations of certain elements (e.g., turn on television 120a, switch to particular channel(s) at particular days/times, and/or record if recording is supported); monitor environment in the home network, such as by obtaining environmental readings (e.g., temperature, humidity, etc.) via example environmental sensory devices 120h, and may process these readings (e.g., to determine if/when to adjust other home network elements accordingly); adjust one or more example lighting and/or electrical fixtures 120e (e.g., turn lights on or off); lower/raise example window (blinds) 120d; adjust operations of example appliances (e.g., refrigerator 120g), such as, for example, based on a preconfigured power efficiency/optimization profile; monitor for any indications of a security/safety problem, based on, for example, input from example security devices 120i, and/or act accordingly (e.g., send notifications to users, such as by texting example smartphone 120k, and/or automatically notify authorities, e.g., by dialing '911' and/or contacting preconfigured emergency numbers).

In an example embodiment of the disclosure, the home network manager 110 may provide and/or utilize user interface services in the home network. In this regard, the home network manager 110 may be operable to support use of user interface functions, and/or to generate and/or store information corresponding thereto, which may be utilized to enable interactions between the home network manager 110 and users (e.g., in the home network 100). For example, in some implementations, the home network manager 110 may be configured to generate and/or use a graphic user interface (GUI), for visually displaying information and/or providing interactivity with users (e.g., for providing input thereby). One or more user interfaces may enable configuring the home network manager 110 and/or functions provided by the home network manager 110. In an example embodiment of the disclosure, the one or more user interfaces may enable user interaction with, configuring and/or adjusting other elements in the home network 100 (e.g., elements connected to the home network manager 110).

In an example embodiment of the disclosure, the user interfaces may be provided via one or more other devices that may be communicatively coupled to the home network manager 110. For example, a GUI generated and/or used by the home network manager 110 may be displayed using existing home network elements, such as, for example, television 120a, laptop 120b, tablet 120j, and/or smartphone 120k.

The disclosure is not limited to a single network (e.g., home network 100) and/or a single network manager (e.g., home network manager 110). For example, one or more networks (e.g., home network 100) and/or one or more network managers (e.g., home network manager 110) may be grouped together. The grouping may correspond to one or more locations (e.g., location 101).

In an example embodiment of the disclosure, a network (e.g., home network 100) may be associated with one or more network managers (e.g., home network manager 110). For example, one network manager may be associated with one or more networks (e.g., home network 100) and/or locations (e.g., location 101).

In an example embodiment of the disclosure, a grouping of networks may comprise one or more network, network managers and/or locations. The grouping may be programmable and/or configurable. For example, one more networks may be defined, and one or more network managers may be assigned per network and/or associated with one or more devices with a network and/or a network manager. In this regard, the information may be shared between the different networks, network managers and/or devices assigned to the different networks and/or network managers. For example, information gathered on one network (e.g., by a network device, through an occurrence of a condition, event, an alarm, and/or other predefined and/or preconfigured condition) may cause the information to be communicated on the same and/or another associated network. In this regard, the information may trigger a condition, an alarm, an occurrence of an event and/or any other predefined and/or preconfigured condition (e.g., operation of a device, network element) on the same and/or another associated network.

Figure 2:
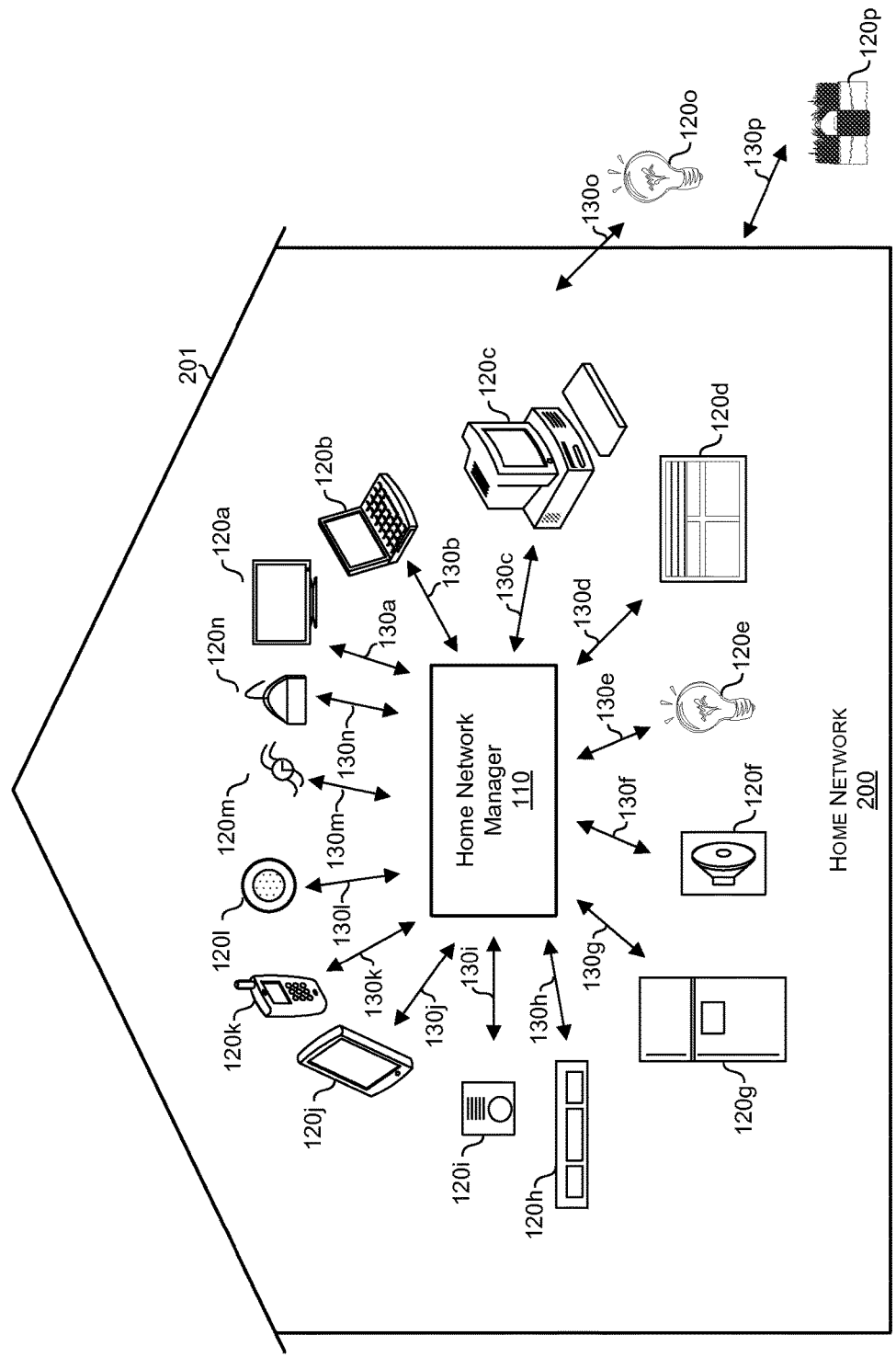
FIG. 2 illustrates a second example home network.

FIG. 2 illustrates a second example home network 200, wherein like numerals refer to like parts. The second home network 200 may include a plurality of devices exteriorly. In this regard, similar to FIG. 1, the second home network 200 may correspond to a second location 201. The location 201 may, for example, correspond to a premise, a residence (e.g., home, apartment) or non-residence premises (e.g., small business, school, library, factory). In this regard, the second home network 200 may, for example, comprise a plurality of home network elements, such as, for example, a plurality of home network elements 120a-120p. The home network elements (e.g., home network elements 120a-120p) may, for example, comprise one or more devices, systems, fixtures, appliances, and/or other circuitry. The home network elements (e.g., home network elements 120a-120p) may comprise, for example, one or more televisions 120a, one or more computers (e.g., laptop computer 120b, desktop computer 120c), one or more personal and/or handheld devices (e.g., tablet 120j, mobile phone 120k, smart watch 120m), one or more multimedia devices and/or components (e.g., speakers 120f), one or more structural fixtures (e.g., windows/window blinds 120d), one or more lighting and/or electrical fixtures 120e, one or more appliances (e.g., refrigerator 120g), one or more environmental sensory devices 120h (e.g., thermometers, humidity meters), and/or one or more security devices 120i (e.g., a smoke detector, a carbon monoxide detector, a security alarm, a motion detector) one or more sensors and/or controller (e.g., intelligent motion sensor 120l, RGBW controller 120n), one or more exterior lighting and/or electrical fixtures 120o, one or more exterior apparatuses 120p (e.g. a sprinkler system).

Like in the home network 100, the home network manager 110 at the second location 201 may interact with one or more of the home network elements 120a-120p via corresponding links 130a-130p, which may be supported by the home network manager 110 and/or the corresponding home network element(s). For example, the links 130a-130p may be implemented and/or configured to operate using a wireless protocol, such as, for example, a Z-wave protocol. In an example embodiment of the disclosure, the home network 100 may be implemented as Z-Wave network. However, the disclosure is not limited in this way. For example, the home network 110 may comprise one or more wired and/or wireless links and/or protocol. Wireless links and/or protocols, may comprise, for example, WPAN (e.g., Bluetooth or ZigBee), low power links (e.g., Bluetooth LE (BLE), Bluetooth Smart, iBeacon), near field communication protocols (e.g., NFC) and/or WLAN (WiFi/802.11) protocols and/or any other wireless links and/or protocols suitable for implementation consistent with the disclosure. Wired protocols and/or links may comprise, for example, Ethernet, Universal Serial Bus (USB), and/or any other wired links and/or protocols suitable for implementation consistent with the disclosure.

In some embodiments, the home network 100/200 may have a built in functionality to declare an element or device, or a Z-Wave device as dead, inactive, and/or out for range. For example, if the device does not respond to control commands or after a predefined amount of time, the home network 100/200 may check the device that does not respond with control frame checks, for example, via heartbeat polling, on the network, the device may be marked as dead, inactive, disconnected, and the like. In this way, a user may be made aware of the dead or inactive device if any issues occur with a specified device. A dead, inactive and/or out of range device may also be marked and displayed by the home network manager 110.

Figure 3:
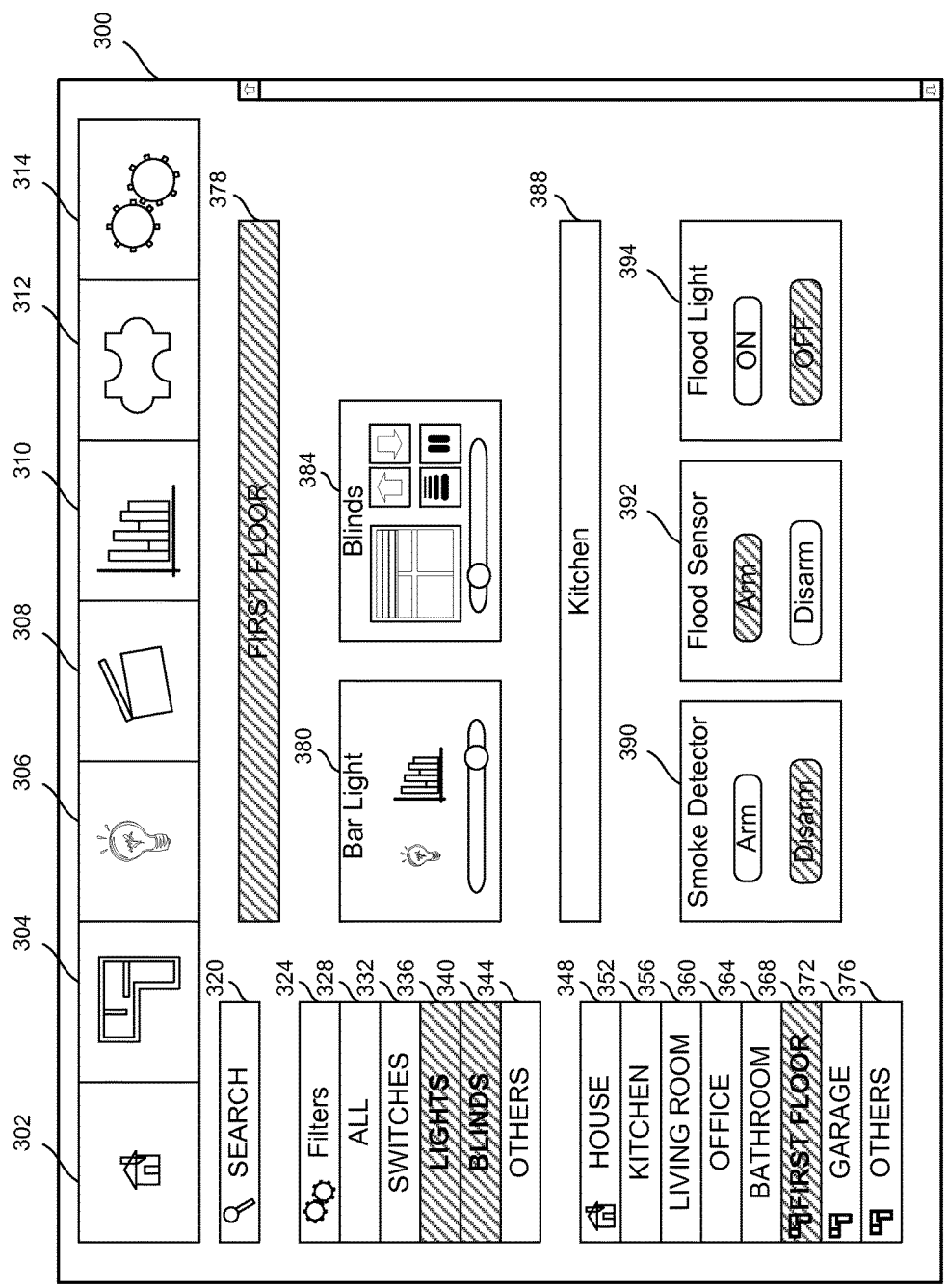
FIG. 3 illustrates an exemplary home screen of an electronic management user-interface.

FIG. 3 illustrates an exemplary home screen of an electronic management user-interface 300 for use with an exemplary home network manager, for example, the home network manager 110 as shown in FIGS. 1 and 2. In some embodiments, the electronic management user-interface 300 may be accessed through one or more televisions 120a, one or more computers (e.g., laptop computer 120b, desktop computer 120c), one or more personal and/or handheld devices (e.g., tablet 120j, mobile phone 120k, smart watch 120m), and the like, via links 130a-130p, which may be supported by the home network manager 110.

Figure 3A:
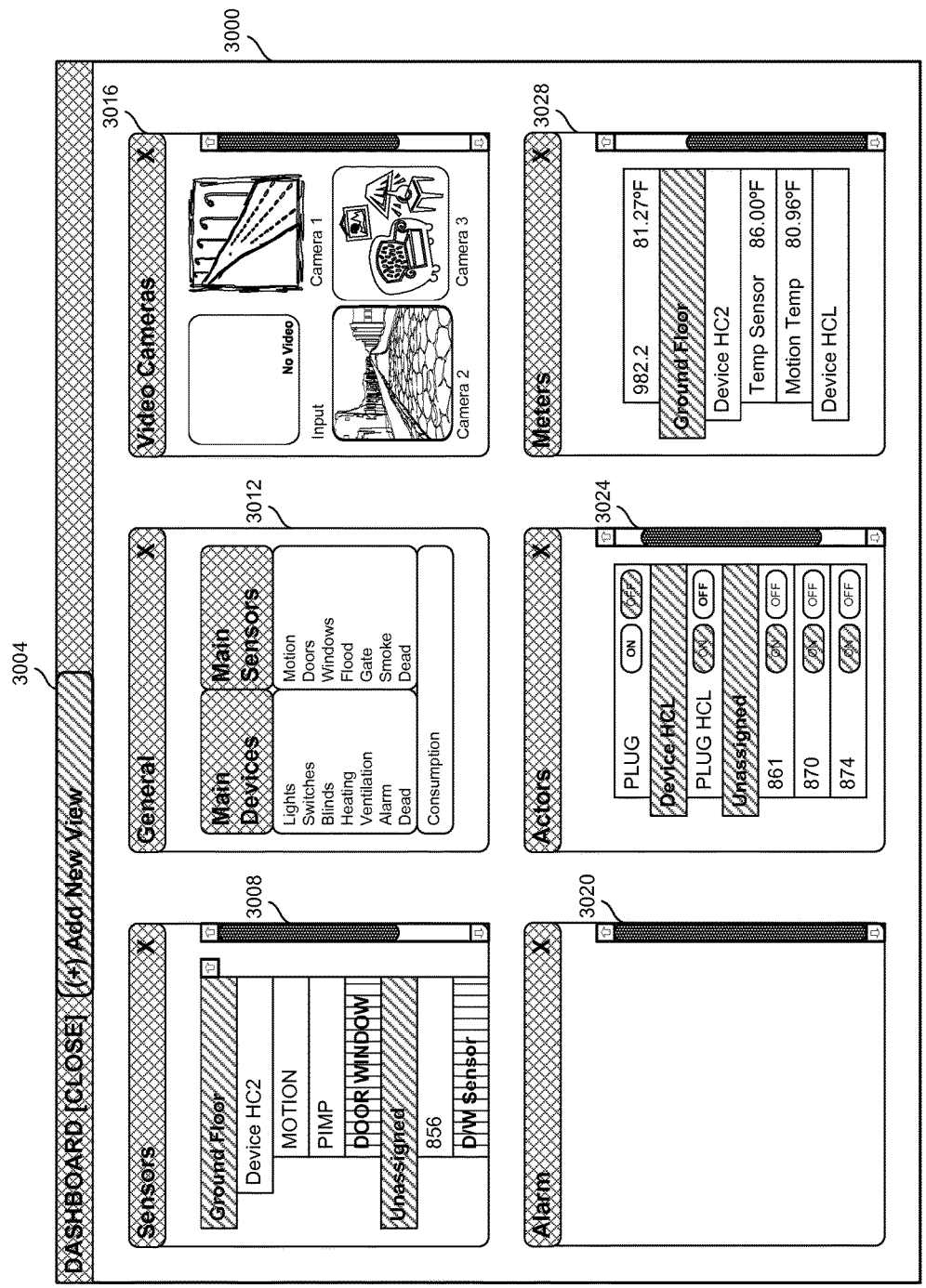
FIG. 3A illustrates an exemplary dashboard screen of an electronic management user-interface.

In some embodiments, the home network manager 110 also may include an alternate customizable home screen that may allow for monitoring system status, alarms, lighting conditions, energy consumption, heating, and the like, via one or more selections on the alternate home screen. FIG. 3A illustrates an exemplary alternate home screen or a dashboard view 3000 that may be customized by a user. In the example embodiment shown in FIG. 3A, the home screen 3000 is customizable via an "Add New View" tab 3004. The home screen 3000 currently shows the status of sensors within a home network in box 3008, general status of main devices and main sensors in the home network in box 3012, current images recorded by cameras of the home network in box 3016, alarm status in box 3020, actor status in box 3024, and meter status in box 3028. Through the boxes 3008-3028, a user may manage and view devices situated within an associated location, for example, location 101 as shown in FIG. 1, and location 201 as shown in FIG. 2, using one or more of the personal and/or handheld devices (e.g., tablet 120j, mobile phone 120k, smart watch 120m), with or without internet access, from anywhere in the world.

Referring back to FIG. 3, the electronic management user-interface 300 displays a plurality of tabs, for example, a HOME tab 302, a ROOM tab 304, a DEVICE tab 306, a SCENE tab 308, an ENERGY tab 310, a PANEL tab 312, and a CONFIGURATION tab 314, which are detailed hereinafter. Although only seven tabs are shown, it would be understood that the electronic management user-interface 300 may be expandable to include additional tabs suitable for a particular location or the set of devices situated within the particular location. Through the tabs 310-314, a user may manage and control devices situated within an associated location, for example, location 101 as shown in FIG. 1, and location 201 as shown in FIG. 2, using one or more of the personal and/or handheld devices (e.g., tablet 120*j*, mobile phone 120*k*, smart watch 120*m*), with or without internet access, from anywhere in the world.

In some embodiments, the electronic management user-interface 300 may be a main window or interface for the home network manager 110. The electronic management user-interface 300 may display one or more, or all devices available within a given location, such as modules, sensors and virtual devices. In the embodiment as shown in FIG. 3, the electronic management user-interface 300 may include a search function box 320, which may allow a user to enter a search criteria locating for a particular item, for example, one of the aforementioned devices. The electronic management user-interface 300 may allow a user to group and thus display some or all of the devices based on a device type, and/or a device location through a filter tab 324. For example, when the Filters tab 324 has been selected, the electronic management user-interface 300 displays all devices or elements in a location with an ALL tab 328, all switches through a SWITCHES tab 332, all light fixtures through a LIGHTS tab 336, all blinds through a BLINDS tab 340, and other elements through an OTHERS tab 344. Examples of element tabs include, but are not limited to, a sensors tab, dimmers tab, thermostats tab, cameras tab, scenes tab, home entry systems tab, and any unassigned tabs. In the embodiment shown in FIG. 3, LIGHTS tab 336 and BLINDS tab 340 have been selected.

Further, as shown in FIG. 3, the electronic management user-interface 300 may also be configured to display elements or devices of a plurality of areas within a location. For example, in the embodiment shown, the electronic management user-interface 300 displays all elements defined in a) a location through a HOUSE tab 348, b) a kitchen through a KITCHEN tab 352, c) a living room through a LIVING ROOM tab 356, d) an office through an OFFICE tab 360, e) in a bathroom through a BATHROOM tab 364, f) in a first floor through a FIRST FLOOR tab 368, g) in a garage through a GARAGE tab, and h) in other defined areas through a OTHERS tab 376. Exemplary defined area tabs, though not show, may include, but re not limited to, corridor(s), bathroom(s), basement(s), garden(s), bedroom(s), mud room(s), play room(s), kids room(s), second floor, and/or any unassigned areas. In the embodiment shown, the FIRST FLOOR tab 368 has been selected. As such, the electronic management user-interface 300 displays a Bar Light window 380 and a Blinds window 384 located on a first floor of the location 201.

The ROOM tab 304 may allow a user to preview states of an existing room, and to add rooms and sections for additional monitoring. In some embodiments, for example, rooms and/or section may include single rooms, room groups, floors, or any user-defined areas or locations. To add a section or a room, a user first selects an ADD tab (not shown), selects a section or a room is to be added, and enters a name of the new area. The electronic management user-interface 300 may display the newly added room or section with the entered name. The ROOM tab 304 may also allow a user to preview states and values of various elements, devices and sensors defined in an area or the added room/section. A user may also control groups of elements such as one or more lighting and/or electrical fixtures 120*e*, one or more structural fixtures (e.g., windows/window blinds 120*d*, such as roller shutters) and one or more security devices 120*i*. The ROOM tab 304 may also show a temperature, humidity level, and a state of door/window and movement sensor. If a room is not equipped with a particular type of elements, screens of the corresponding room may be left blank.

Figure 4:
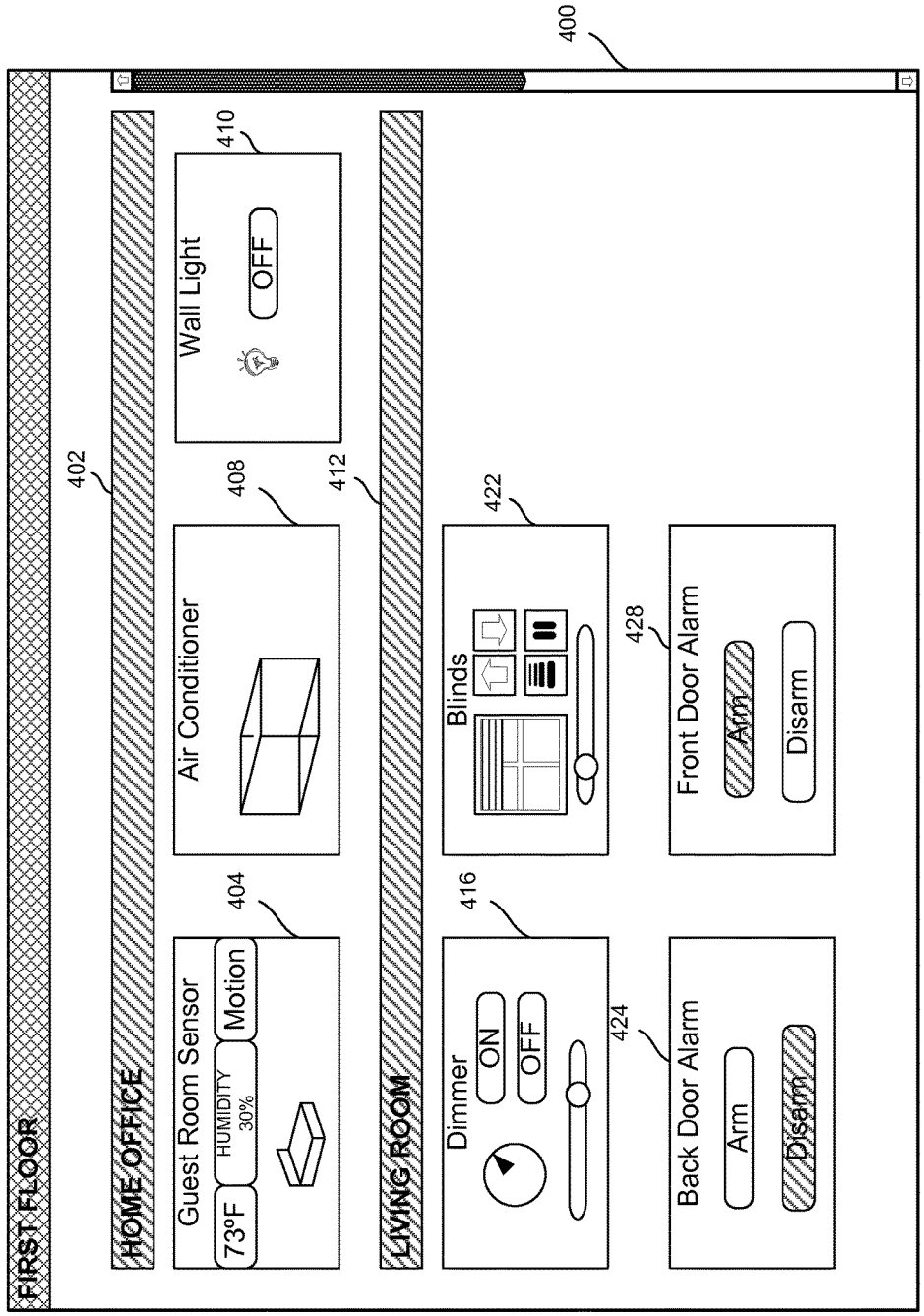
FIG. 4 illustrates an exemplary screen of a DEVICE tab.

The DEVICE tab 306 of the electronic management user-interface 300 may allow a user to manage the home network elements (e.g., home network elements 120*a*-120*p*). When selected, the DEVICE tab 306 may display one or more, or all elements defined within a location selectable by a user, for example, a first floor of a location similar to the location 201 of FIG. 2. An exemplary screen 400 of the DEVICE tab 306 is shown in FIG. 4. In the embodiment shown, the screen 400 shows a portion of a first floor of the location 201. The first floor, as shown in FIG. 4, includes a guest room that has defined a guest room sensor, a wall light, and an air conditioner, in a home office. The guest room sensor also shows a temperature sensor reading (73° F.), a humidity sensor reading (30%), and an armed motion sensor. When a HOME OFFICE tab 402 is selected, a GUEST ROOM SENSOR window 404 may be displayed to indicate a status of the guest room, for example, whether the guest room is occupied or not. An AIR CONDITIONER window 408 is also displayed with respect to the HOME OFFICE tab 402 to indicate an operating status, for example, of the air conditioner. A WALL LIGHT window 410 may also be displayed showing on OFF status. The screen 400 may also include a scroll bar 430 that may allow a user to see the remaining elements on the first floor. Thus, it should be noted that the screen 400 is only an exemplary screen generally showing statuses of elements on the first floor. In other embodiments, the screen 400 may be configured differently based on user needs. Further, the screen 400 may also be configured to display additional elements and/or devices based on the SEARCH filter 324 (of FIG. 3) that has been applied. Thus, it should be understood that the screen 400 as shown in FIG. 4 only shows a particular scenario based on a specific search filter.

The first floor, as shown in the embodiment of FIG. 4, also includes a LIVING ROOM tab 412 indicative of a living room. Elements defined with respect to the living room are displayed with the LIVING ROOM tab 412. In the embodiment shown, the living room may include a dimmer switch, a blind, a back door, and a front door. Status of the dimmer switch is thus shown as a DIMMER window 416 along with a plurality of dimmer controls including an ON button, an OFF button, and a dial for dimming a light associated with the dimmer. Status of the blind may be displayed in a BLINDS window 422 allowing a user to pull up the blinds, to release the blinds, or to open the blinds to a desired degree, with a plurality of buttons and a slider. Alarm statuses of the front door and the back door are also displayed in a BACK DOOR ALARM window 424 and FRONT DOOR ALARM window 428.

The DEVICE tab 306 may also allow a user to add or delete any elements or device of a corresponding location. The DEVICE tab 306 may also allow a user to add any compatible cameras such as JPEG cameras and MJPEG IP cameras. In some embodiments, a user may add a fixed, random, or unlimited number of IP cameras to the home network. The DEVICE tab 306 may also allow a user to configure the home network to preview image recorded by the IP cameras via the CONFIGURATION tab 314 or any of the computers (e.g., laptop computer 120*b*, desktop computer 120*c*), and personal and/or handheld devices (e.g., tablet 120*j*, mobile phone 120*k*, smart watch 120*m*). In some embodiments, the DEVICE tab 306 may also allow a user to control or adjust movement and positioning of any compatible cameras, for example.

Figure 5A:
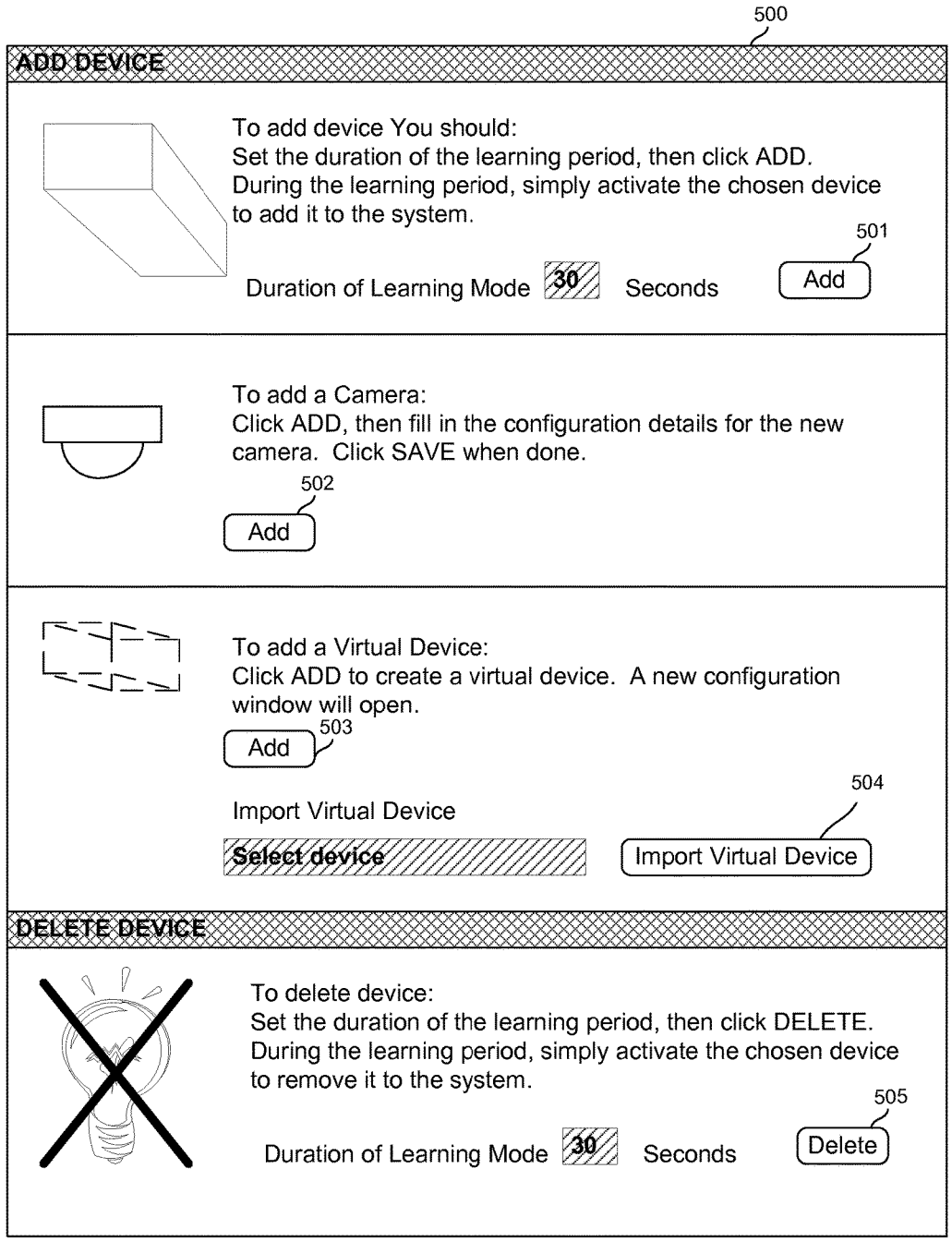
FIG. 5A illustrates an exemplary interface for adding/deleting a device.
Figure 5B:
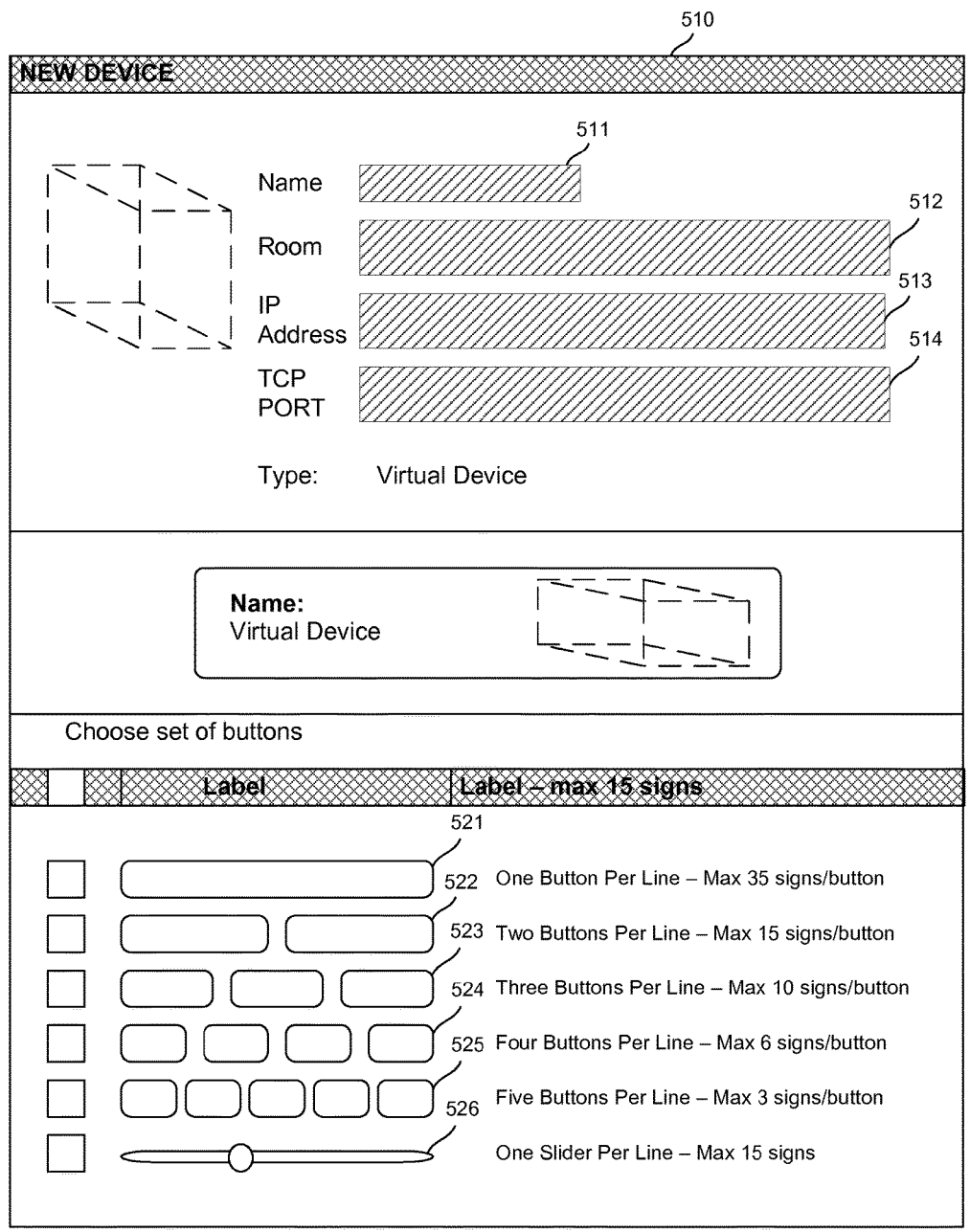
FIG. 5B illustrates an exemplary interface for adding a user-defined virtual device.
Figure 5C:
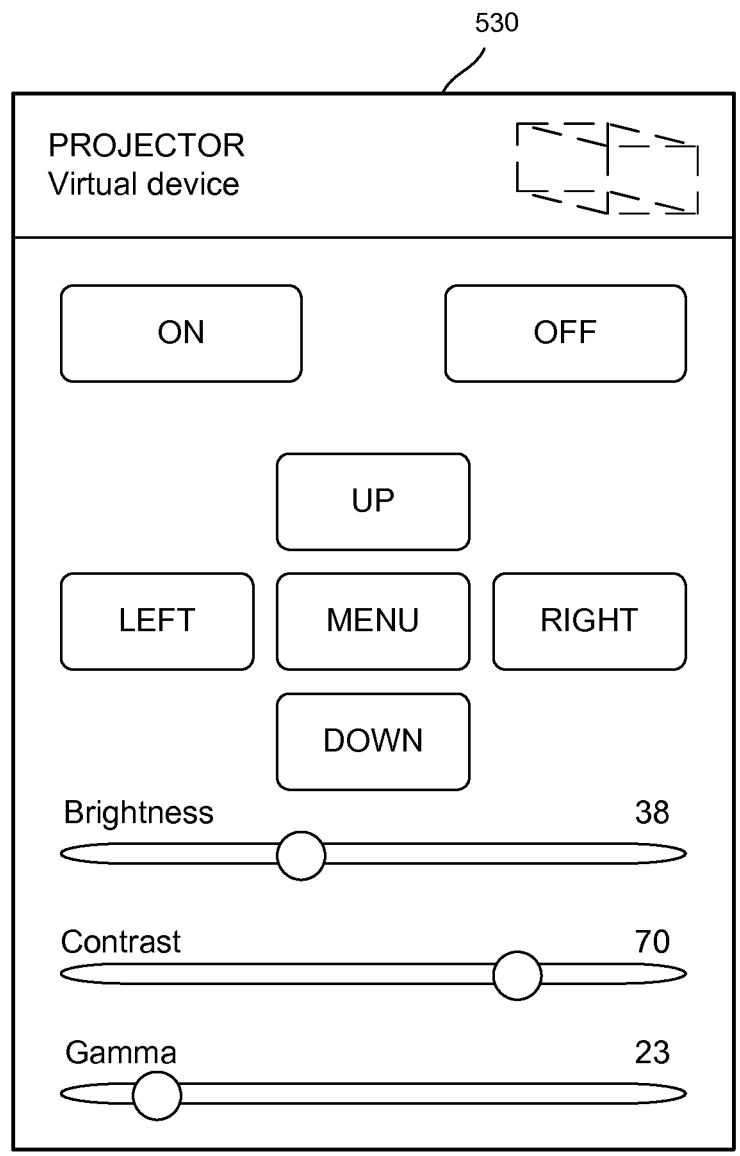
FIG. 5C illustrates an exemplary interface created for a user-defined virtual device.

Further, the DEVICE tab 306 may also allow a user to add one or more virtual devices including complicated devices such as boilers, air conditioning units, and home appliances (kitchen, audio and video appliances), and the like. These virtual devices may be managed through multiple component communication protocols, and the use of RS232 and Ethernet ports. In some embodiments, to add a virtual device, the DEVICE tab 306 through a DEVICE panel (not shown) may prompt a user to select a number of parameters of the virtual device that require control and/or monitoring. The DEVICE panel may prompt the user for control instructions, for example, setting strings and LUA code, and a respective communication protocol and/or port for controlling the virtual device. FIG. 5A illustrates an exemplary DEVICE panel 500 that provides options for a user to add a device 501, to add a camera 502, to add a virtual device 503 or to import a virtual device 504, or to delete 505 a particular device from the home network 200. If a user selects to add a virtual device with option 503, a user may configure the virtual device through the DEVICE panel 500. FIG. 5B illustrates an exemplary screen 510 for adding and configuring a virtual device with option 503 of FIG. 5A. In the embodiment shown in FIG. 5B, the exemplary screen 510 may prompt a user to enter a name of the virtual device at box 511, where the virtual device is located at box 512, an IP address of the virtual device at box 513, and a transmission communication protocol (TCP) port of the virtual device at box 514. The user may also be provided with configuration options of installing sliders and/or buttons within the interface 300 or an associated device and/or controller such as the desktop 120c of FIG. 2 to control the virtual device. Particularly, with respect to the embodiment shown in FIG. 5B, the configuration options include one button per line 521, two buttons per line 522, three buttons per line 523, four buttons per line 524, five buttons per line 525, and one slider per line 526. In some embodiments, after setting proper configuration of each of the buttons, proper setting for specific buttons may be entered. Thereafter, each line of buttons may be configured separately. In other embodiments, each line of buttons may be configured together. In still other embodiments, each line of buttons may be configured independently, while other buttons may be configured together. FIG. 5C illustrates a user-defined virtual device 530 created with the screen 510 of FIG. 5B. In the embodiment shown, the virtual device 530 is a projector, with seven buttons for operating the projector including ON, OFF, UP, DOWN, LEFT, RIGHT, and entering an operating menu via a MENU button, and three sliders for controlling brightness, contrast, and Gamma of the projector.

The SCENE tab 308 of the electronic management user-interface 300 may let a user program a plurality of complicated functions between multiple devices included in the second home network 200. Each scene may be initiated by weather condition, a series of intuitive timers or various sensor/module states. A scene may generally include a group of commands sent to a user defined group of devices. For example, a command such as "open the blinds 50%; and set the lights to 30% brightness" may be entered for a particular room to open the blinds at 50% brightness and to set lights to 30% brightness. In some embodiments, one or more scenes may be initiated within the SCENE tab 308, for example, by user-defined actions such as "run the scene if the motion sensor is tripped or the room temperature exceeds 27 degrees." In another embodiment, one or more scenes may be initiated within the SCENE tab 308, for example, by defining one or more timers, such as "run the scene each day at 8:30 am, and on Monday at 12:15 pm."

In some embodiments, the SCENE tab 308 provides a plurality of alternatives to create and configure a scene. For example, in one embodiment, the SCENE tab 308 may provide a graphical, block interface to create and configure a scene. Scenes created with the graphical block interface may be intuitive to build. Alternatively, the SCENE tab 308 may provide a programming environment in which a user may enter programming instructions, for example, based on a LUA engine, and thus may require some basic programming skills. In such embodiments, when creating scenes based on LUA using LUA scripting language, a user may select an action and characteristics or properties of individual devices from a context menu. For example, in some embodiments, scenes may be added within the SCENE tab 308 via programming and/or "if" and "then" logic compositions. In such embodiments, a user may add a scene for activating a sprinkler if an exterior humidity drops below 0% for five hours. Thus, in some embodiments, a user may select a predefined parameter and compare the predefined parameter with a threshold above which an action is to be taken, for a predetermined amount of time, for example.

Figure 5D:
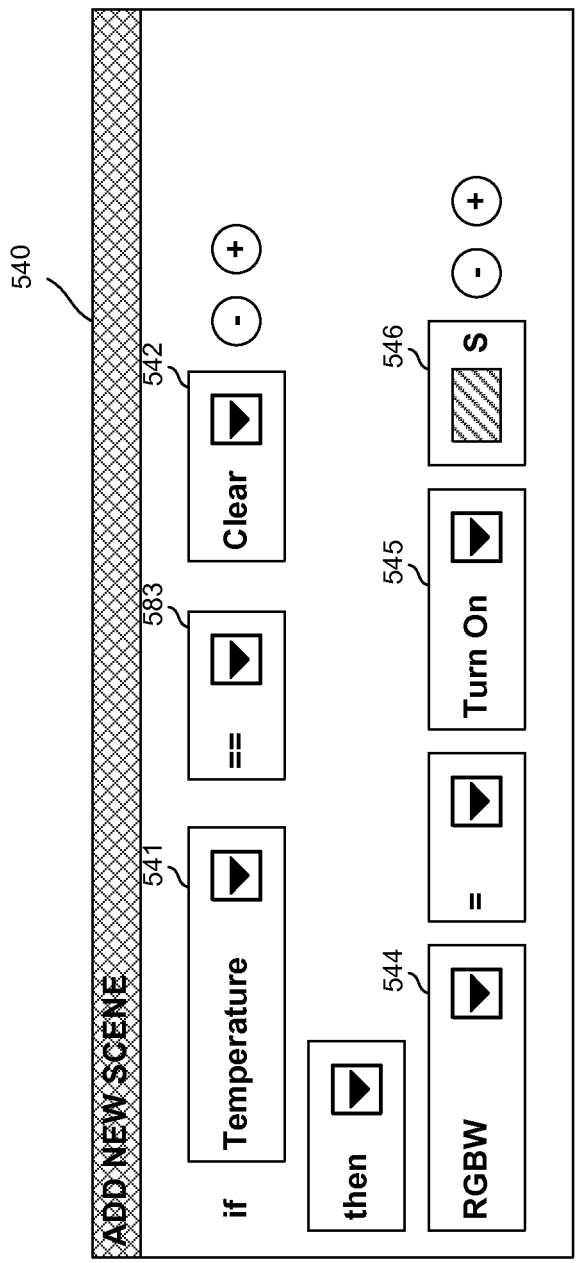
FIG. 5D illustrates an exemplary interface for adding a scene.
Figure 5E:
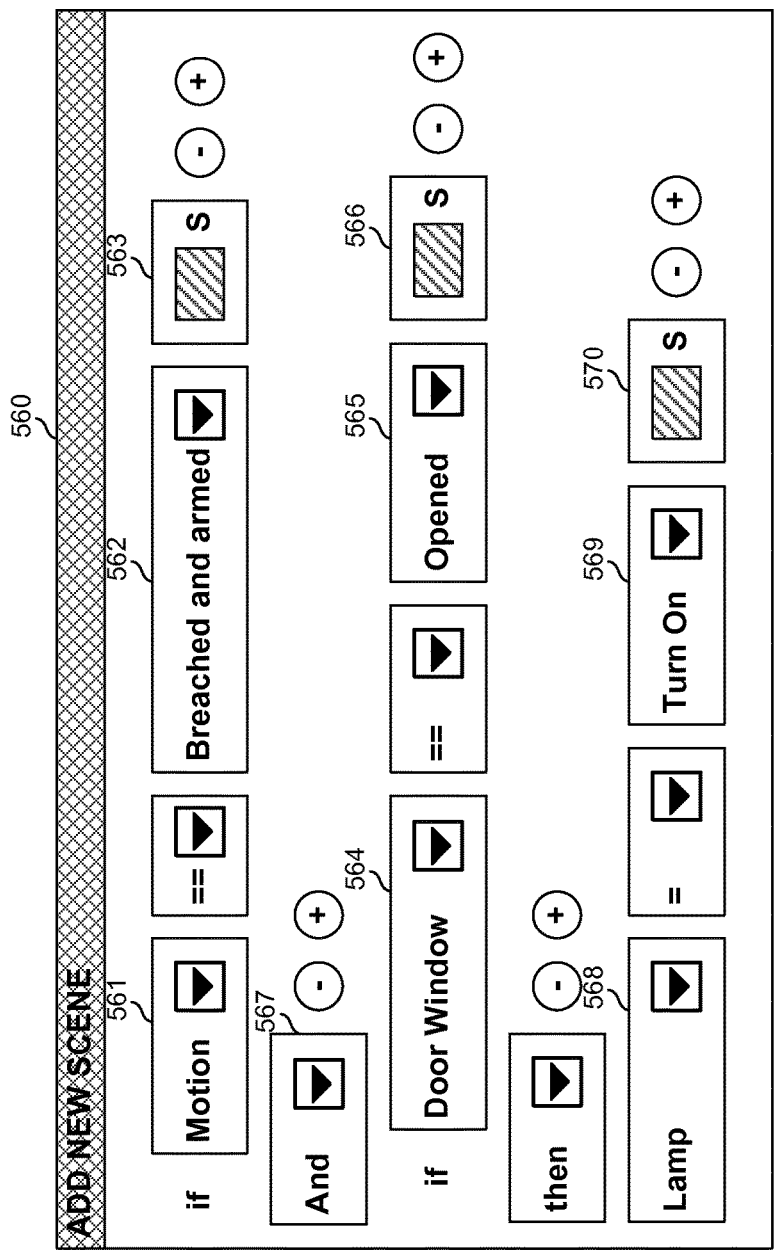
FIG. 5E illustrates another exemplary interface for adding a scene.

FIG. 5D and FIG. 5E illustrate a first ADD scene programming screen 540 and a second ADD scene programming screen 560, respectively. In the first ADD scene programming screen 540, the parameter is a temperature selected in box 541, and the threshold may be defined in box 542. In this embodiment, the comparison is equality in box 543. For example, if the threshold is set to 100° F., and if the temperature sensed equals to 100° F., an action (as defined in box 544) is to be taken place. In this embodiment, the action to be taken is to turn on (in box 545) the RGBW controller for a predefined amount of time selectable by a user in box 546. Similarly, in the second ADD scene programming screen 560, two different conditions have to be met. The first condition includes determining if a MOTION sensor as defined in box 561 has been breached and armed as defined in box 562 for an amount of time in box 563. In the embodiment shown in FIG. 5E, the second condition includes determining if a DOOR WINDOW as defined in box 564 has been opened as defined in box 565 for an amount of time in box 566. When both the first condition and the second condition have been met, as defined in box 567, a lamp as defined in box 568 will be turned on as defined in box 569 for an amount of time as defined in box 570.

Figure 6:
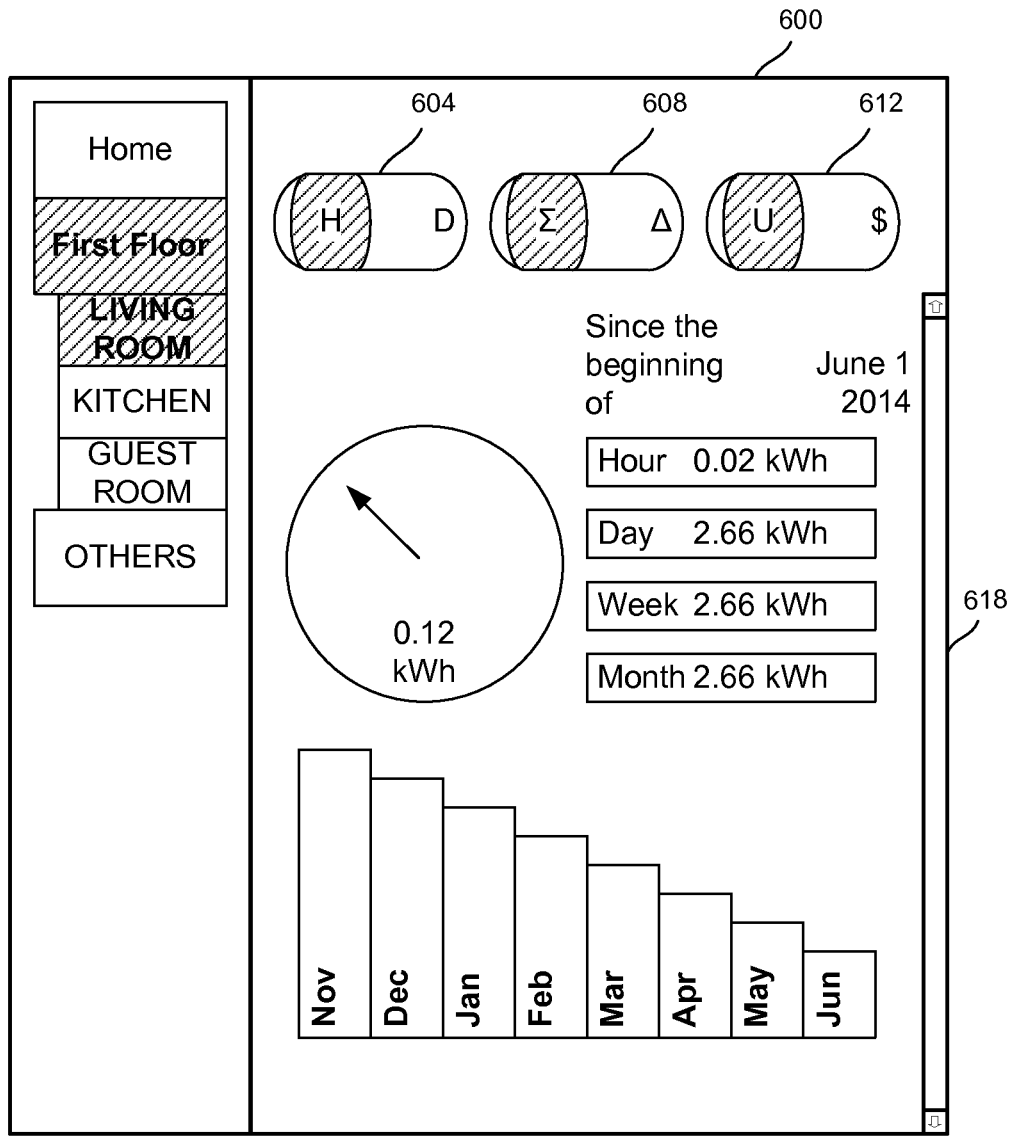
FIG. 6 illustrates an exemplary energy screen of an ENERGY tab.

FIG. 6 illustrates an exemplary energy screen 600 of the ENERGY tab 310 of FIG. 3. The energy screen 600 shows commodity consumed by one or more elements within a predefined area, such as a location, a room, or a section. In the embodiment shown, the commodity is energy usage in wattage hour, kWh, which may be reported or monitored by commodity sensors of one or more electronic devices consuming the commodity. Slider 604 may allow a user to select to display the energy consumed by devices within either a predefined area (D) or a different area (H). Slider 608 selects may allow a user to select to display either a summary of commodity usage (Σ) or a comparison of commodity usages (Δ). Slider 612 may allow a user to select to display either a unit of commodity usage (U) or a monetary or cost equivalent of commodity usages ($). In the embodiment shown in FIG. 6, a user has selected to display a summary of commodity usage by devices within an area different than the predefined area in a commodity usage unit, for example, kWh. In the embodiment shown in FIG. 6, the exemplary energy screen 600 may also allow a user to select a specific area for which the energy consumption is determined. In the embodiment shown in FIG. 6, the living room of the first floor has been selected. The exemplary energy screen 600 also shows that the energy consumption within the hour, the day, the week, and the month, respectively. The exemplary energy screen 600 also shows an exemplary bar chart that illustrates energy consumption on a monthly basis for comparison purposes. Further, the exemplary energy screen 600 also shows scroll bar allowing a user to select other energy parameter to display.

In some embodiments, it is possible to virtually measure energy consumed by a particular element or device even for elements or devices that do not directly report energy used to their respective home network manager. For example, in some embodiments, a home network manager, similar to the home network manager 110 of FIG. 2, may be configured to track an amount of time a particular element or device is running. Based on the amount of time the element is running, and one or more power consumption parameters of the element, an estimate of energy usage may be determined, for example, per second, minute, hour, day, month, and/or year.

Figure 7:
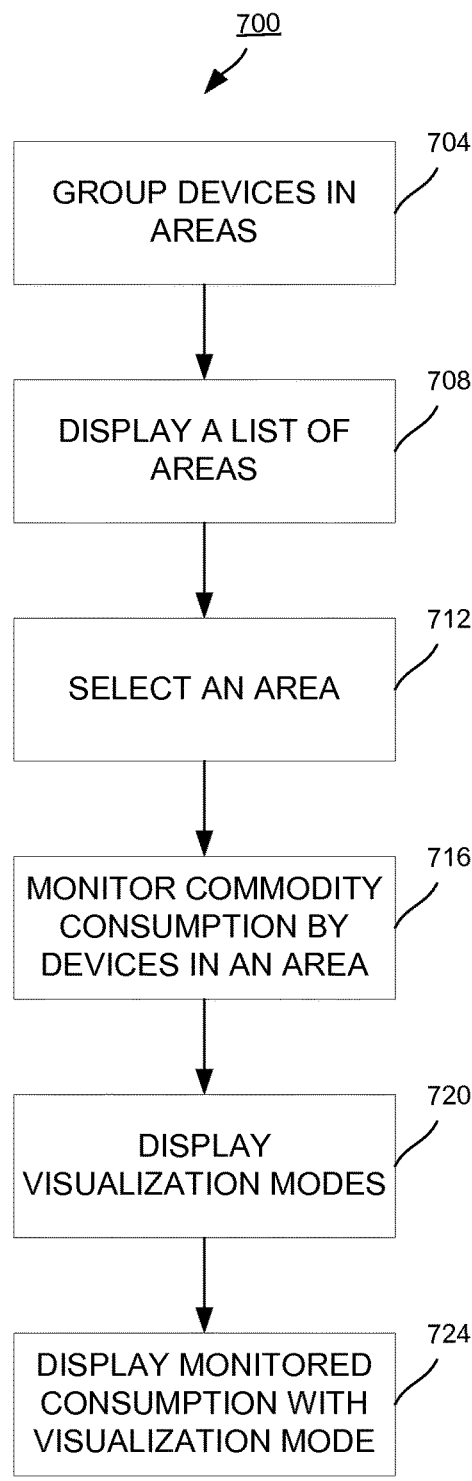
FIG. 7 illustrates an exemplary flow chart for monitoring energy consumption within a location.

FIG. 7 illustrates an exemplary flow chart 700 for monitoring energy consumption within a location. In the embodiment shown, in step 704, for each of a plurality of predefined areas, such as a room or a section, for example, the living room, the electronic management user-interface 300 or the home network manager 110 may group a number of commodity consuming elements or devices, for example, dimmer switches and blinds, that have been registered for the area. In step 708, the electronic management user-interface 300 or a device such as the TV 120*a* displays a list of areas in which a number of commodity consuming elements have been grouped, for example, the living room and the home office. In step 712, the electronic management user-interface 300 may prompt a user to select one or more of the areas for which visualization of commodity consumption is desired. When one or more areas have been selected, in step 716, data indicative of the commodity consumed within the selected area is monitored and/or collected. The electronic management user-interface 300 or a device such as the TV 120*a* in step 720 displays a plurality of visualization modes to visualize the data monitored and/or collected in step 716, for example, between energy consumed by devices and within an entire area, a summary of commodity usage and a comparison of commodity usages, and between a unit of commodity usage and a monetary equivalent of commodity usages, as discussed above with respect to FIG. 6. After a visualization mode has been selected, for example, via the interface 300, a device such as the tablet 120*j*, in step 724, the data indicative of the commodity consumed is displayed with the selected visualization mode.

Figure 8:
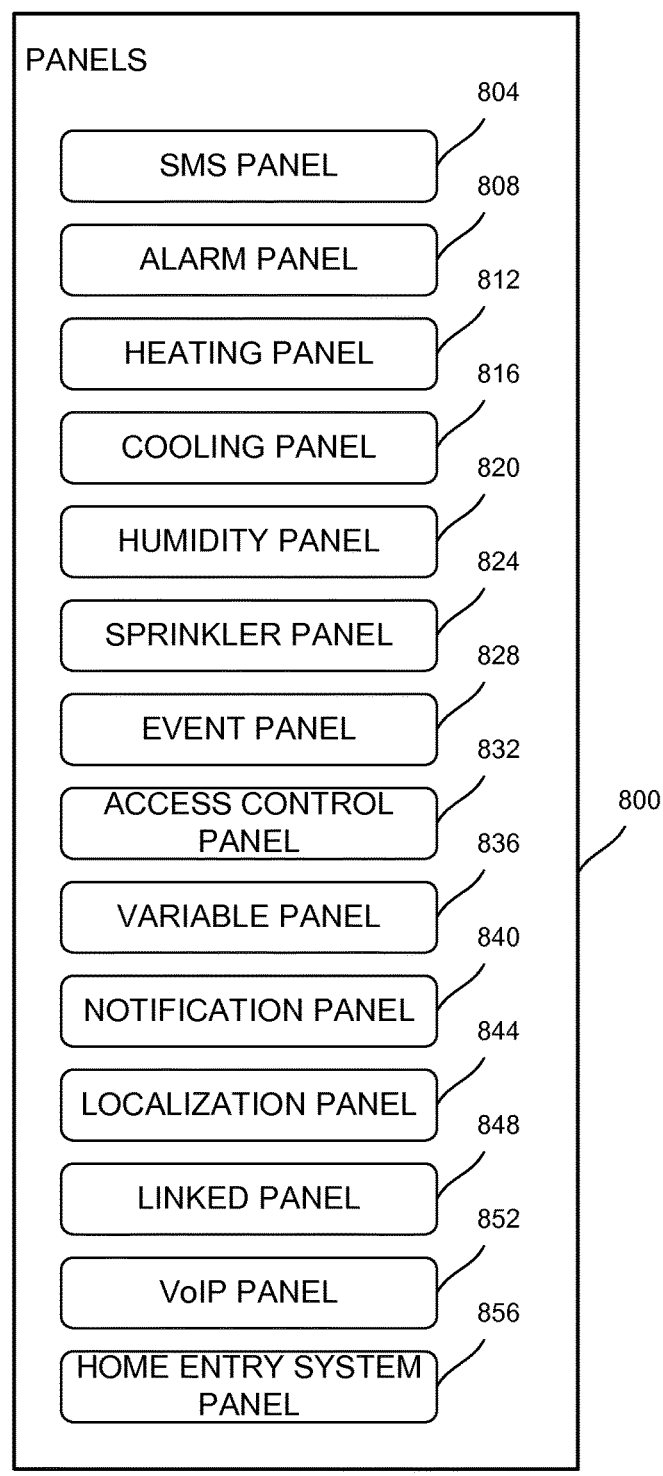
FIG. 8 illustrates an exemplary panel screen.

The PANEL tab 312 (e.g., FIG. 3) may allow a user to manage groups of related devices serving the same functionality, such as heating, air conditioning, or watering the garden. Using Panels, a user may easily program a schedule of operating the elements for an entire week. FIG. 8 illustrates an exemplary panel screen 800. The panel screen 800 may further include a plurality of panels selectable by a user. In the embodiment shown in FIG. 8, the selectable panels may include a short message service (SMS) panel tab 804 which may let a user manage a location via text messages when the Internet access is unavailable, and an ALARM panel tab 808 may let a user manage any registered or defined security system in the location.

Specifically, a user may use the SMS panel 804 to stay in control of a location even when the user may not have a viable internet connection. The user may send a SMS message from a phone number predefined with and authorized by the second home network 200. In some embodiments, the SMS message may be structured with an identification of the home network manager 110, a type or identification of an element, a room or area identification, and an action to be initiated by the element. For example, an SMS message having "HC2-006815.lightslivingroom.on" turns all lights in a living room on. For another example, an SMS message having "HC2-006815.rollerblinds.livingroom.close" closes all roller blinds in the living room. For another example, an SMS message having "HC2-006815.humidity.home.status" sends an SMS message informing of humidity level in each room. For another example, an SMS message having "HC2-006815.temperature.livingroom.23" sets temperature of the living room to 23° C. for a period of time. In some embodiments, the period of time is default at three hours.

Figure 8A:
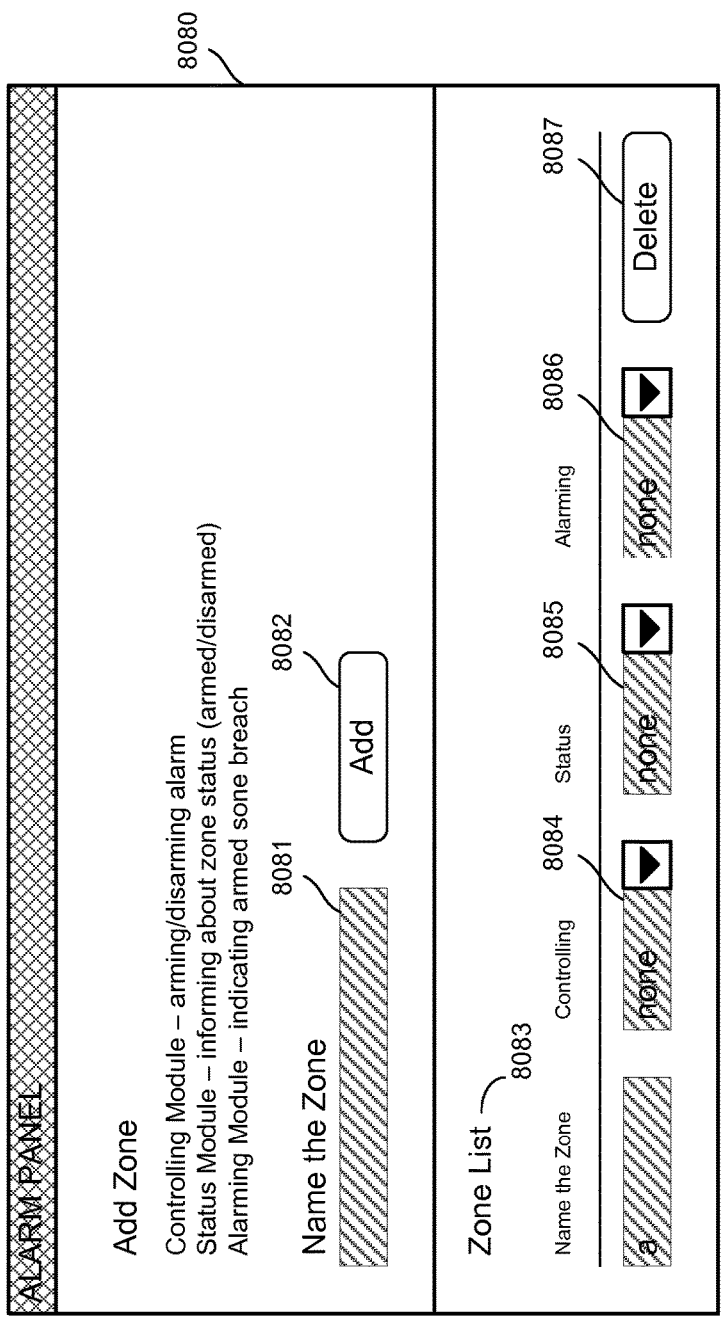
FIG. 8A illustrates an exemplary ALARM panel screen.

In some embodiments, when a user selects the ALARM panel tab 808, the electronic management user-interface 300 may also allow a user to add one or more zones, and either to arm or to disarm each of the one or more zones. FIG. 8A illustrates an exemplary ALARM panel 8080. The ALARM panel 8080 includes a user-entry box 8081 that may allow a user to name a zone for which an alarm is set, and an Add tab 8082 that adds the named zone to a list of zones 8083 available in a home. Each of the zones available also may be associated with a plurality of alarm parameters. In the embodiment shown in FIG. 8A, the alarm parameters include a control parameter 8084 which may arm or disarm a corresponding alarm, a status parameter 8085 which may display a status of the corresponding alarm (for example, whether the corresponding alarm has been armed or disarmed), and an alarming parameter 8086 which may indicate if the corresponding alarm has been breached. A user may also delete or remove a particular alarm when a Delete tab 8087 is selected.

Figure 8B:
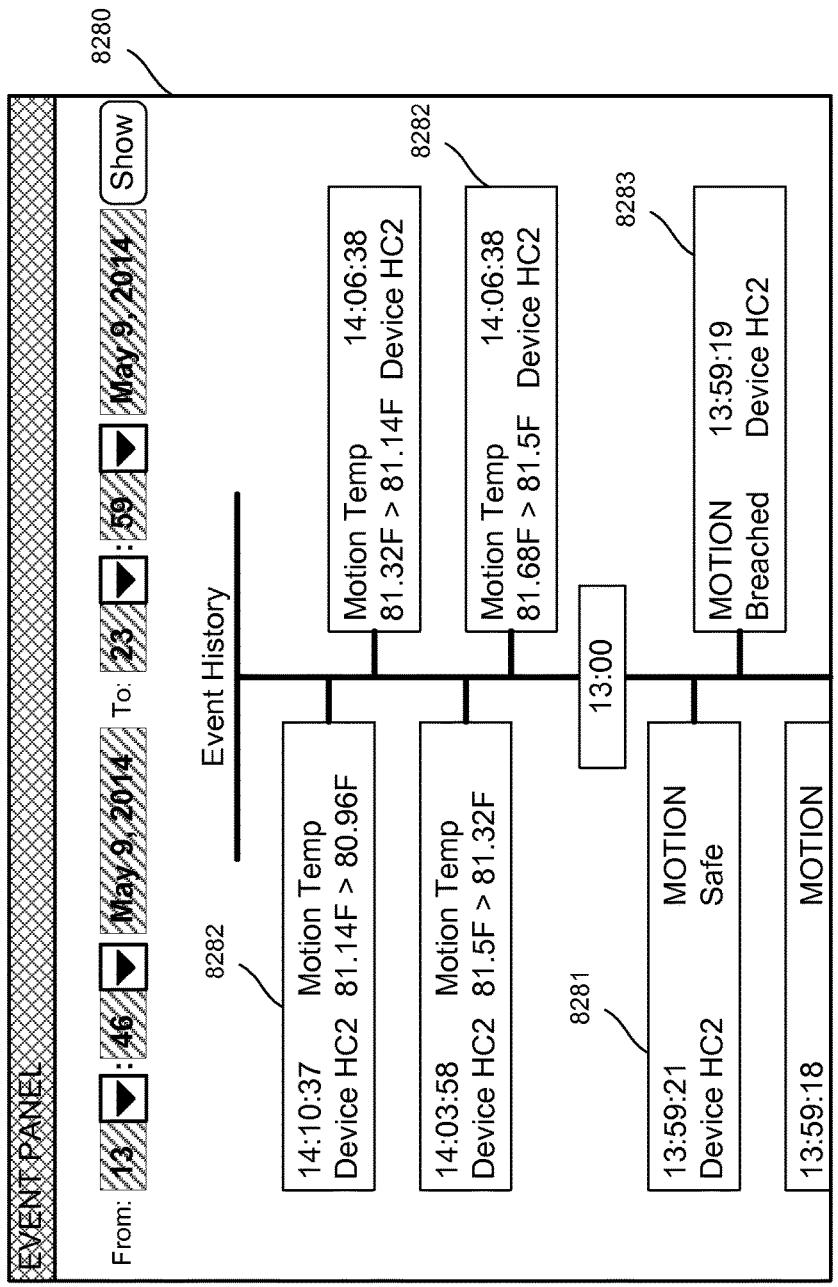
FIG. 8B illustrates an exemplary EVENT panel screen.

Referring back to FIG. 8, the selectable panels may also include a HEATING panel tab 812 that may let a user schedule heating programs at predetermined times, a COOLING panel tab 816 that may let a user schedule cooling programs at predetermined times, a HUMIDITY panel tab 820 that may let a user program related devices to maintain a desired level of humidity in the location, and a SPRINKLER panel tab 824 that may let a user schedule watering programs at predetermined times. In the embodiment shown in FIG. 8, the selectable panels also include an EVENT panel tab 828, when selected, that shows a log of actions carried out by elements defined in the location. FIG. 8B illustrates an exemplary EVENT panel 8280. In the embodiment shown in FIG. 8B, the EVENT panel 8280 displays event history with respect to a first MOTION sensor 8281, a Motion Temperature sensor 8282, and a second MOTION sensor 8283 between 1:46 pm and midnight of May 9, 2014. In the embodiment shown in FIG. 8B, the EVENT panel 8280 illustrates that the Motion Temperature 8282 drops from 81.68° F. to 80.96° F. from 2:06 pm to 2:10 pm. FIG. 8B also illustrates that the first MOTION sensor 8281 is safe, while the second MOTION sensor 8283 has been breached. In some embodiments, if an alarm has been armed for any breaching, the alarm and its associated action process will take place. For example, in some embodiments, the action process may notify a user of the alarm via an electronic communication process, such as, for example, emails, text messages, and the like, discussed hereinafter.

Referring back to FIG. 8, the selectable panels also include an ACCESS CONTROL tab panel 832 which may let a user add other users and define rights of the other users, and a VARIABLE panel tab 836 that may let a user check and change values of global variables used in the SCENE tab 308 (FIG. 3), a NOTIFICATION panel tab 840 that may let a user define the notifications which may be sent by email or SMS, a LOCALIZATION panel tab 844 that may let a user define geographic points which a user may use together with user locations in the SCENE tab 308 (FIG. 3), a LINKED panel tab 848 that combines several devices into a particular device allowing a user to control a group of related devices as one single device, a VoIP panel tab 852 that may let a user add and configure VoIP, and a HOME ENTRY SYSTEM panel tab 856 that may let a user find and install any home entry system or any compatible home entry system.

Figure 8C:
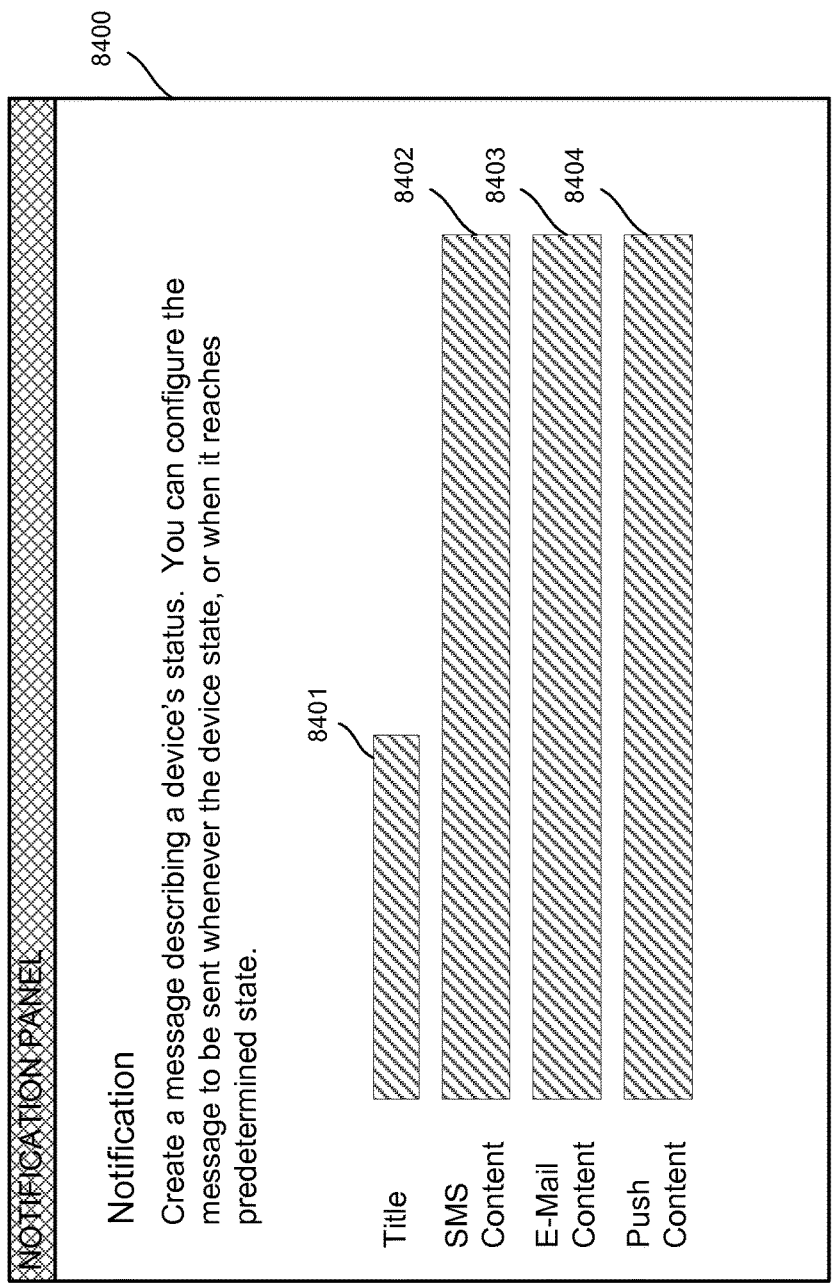
FIG. 8C illustrates an exemplary NOTIFICATION panel screen.

FIG. 8C illustrates an exemplary NOTIFICATION panel 8400. In the embodiment shown in FIG. 8C, the NOTIFICATION panel 8400 illustrates that a user may configure what notification to be sent via a plurality of boxes. For example, the user may enter a title of the notification at box 8401. The user may also select a kind of notification to be sent. In the embodiment shown in FIG. 8C, the NOTIFICATION panel 8400 includes three notification options. For example, box 8402 may allow a user to enter an SMS content to be sent, box 8403 may allow a user to enter an email content to be sent, and box 8404 may allow a user to enter a PUSH content that is pushed to a predefined recipient.

Figure 9:
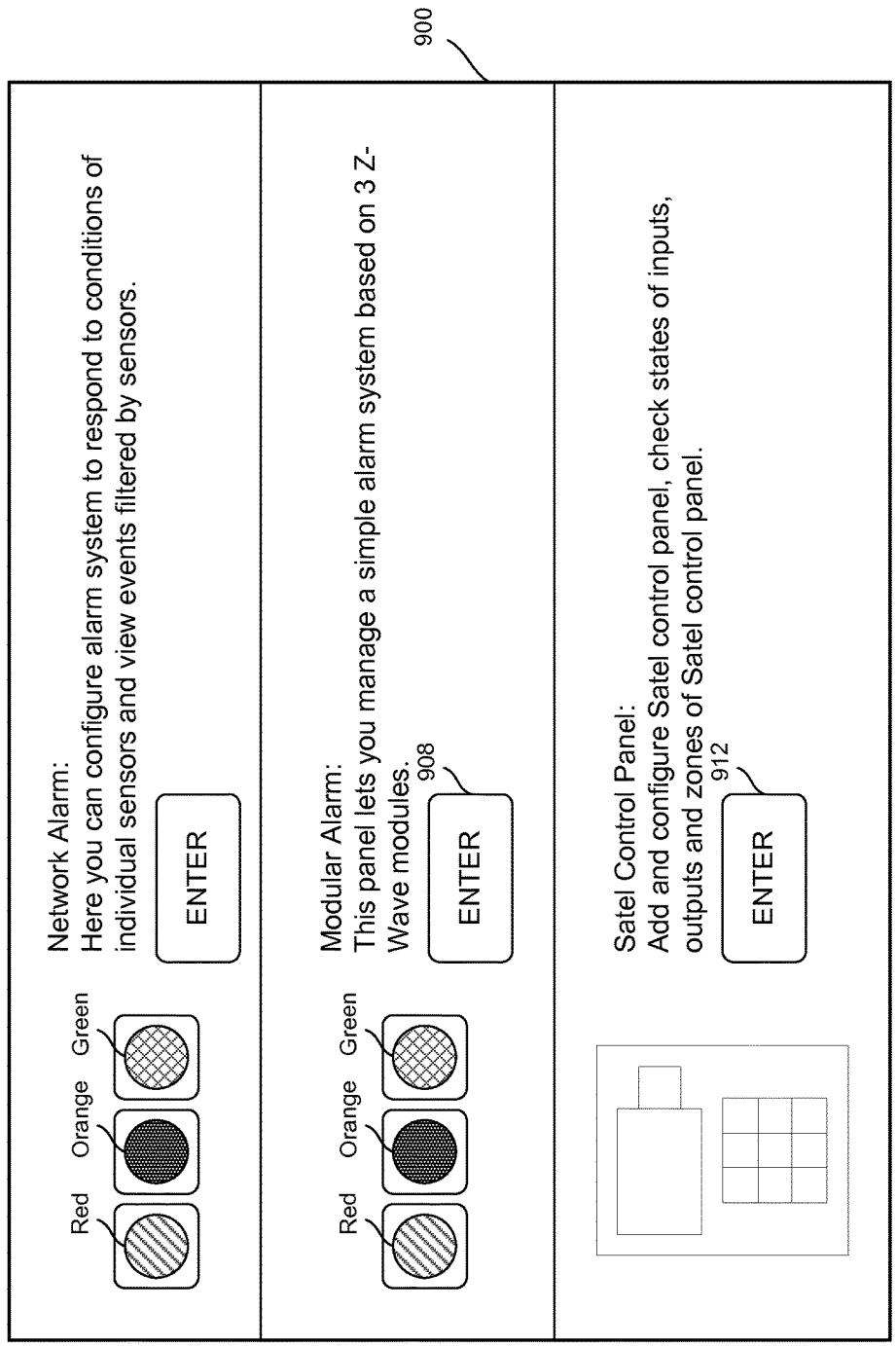
FIG. 9 illustrates an exemplary alarm panel screen of an ALARM panel.

The LOCALIZATION panel tab 844 uses user-defined GPS points to activate GPS scenes. In some embodiments, there are two ways of defining GPS points—choosing on a map, or entering certain GPS coordinates. Each user may enter indefinite number of GPS points. For example, in some embodiments, a user may define two GPS points—one for home, and the other for work. In this regard, it is possible for a user to create scene turning OFF all the lights, for example, in the home once the user leaves HOME, and arms an alarm at the home once the user enters WORK, as determined by the GPS position of the user via a pre-registered mobile device carried by the user. FIG. 9 illustrates an exemplary alarm panel screen 900 of the ALARM panel tab 808 (FIG. 8) on the electronic management user-interface 300. As discussed above, the ALARM panel 808 may manage a plurality of alarm control units integrated into the second home network 200. A plurality of alarm units may be used within the second home network 200. For example, in the embodiment shown, three types of alarms are used in the second home network 200. A Home Network Alarm 904 may let a user configure alarm system to respond to conditions of individual sensors and view events filtered by sensors. In some embodiments, a user may configure an alarm system with any Z-wave sensors (not shown). In some embodiments, the user may select predefined actions for a user-configured alarm system. In other embodiments, the user may also create custom alarm actions. In such embodiments, for example, a user may configure an alarm system to notify the user via a mobile device, a smart device, a text message, and/or an email, when the temperature measured by a temperature sensor or thermostat associated with the alarm system exceeds a predefined temperature and when the user may not be home. In some embodiments, for another example, a user may configure an alarm system to notify the user via a mobile device, a smart device, a text message, and/or an email, when a door may be opened as detected by a door sensor while the home is supposed to be unoccupied. In some embodiments, for yet another example, a user may configure an alarm system to notify the user via a mobile device, a smart device, a text message, and/or an email, when a floor sensor detects that the presence of water on a wall for an extended period of time. In some embodiments, for still another example, a user may configure an alarm system to notify the user via a mobile device, a smart device, a text message, and/or an email, when a motion sensor detects movements in a protected area. In some embodiments, for another example, a user may configure an alarm system to notify the user via a mobile device, a smart device, a text message, and/or an email, when a smoke detector detects the presence of smoke.

Particularly, the Home Network Alarm 904 may allow a user control alarm by monitoring states of security devices 120*i* (e.g., a smoke detector, a carbon monoxide detector, a security alarm, a motion detector) and sensors and/or controller (e.g., intelligent motion sensor 120*l*, RGBW controller 120*n*). When armed, each armed and breached sensor may turn on an alarm. A user may access the ALARM panel 808 (FIG. 8) to specify a particular room that may have a number of selected elements. The user may access the ALARM panel 808 (FIG. 8) and/or the SCENE tab 308 (FIG. 3) to configure one or more alarm scenes that may be associated with the selected elements. For example, in a PANIC SCENE, selected elements such as lights may be configured to be switched on or to flash, roller blinds may be configured to be closed, and images shots and/or predefined notifications may be configured to be sent or emailed via an email module to predefined recipients such as a nearby fire department or the user. For another example, in a LIGHTS ON SCENE, selected elements such as lights or all lights in the location may be configured to be switched on or to flash.

A Modular Alarm 908 may let a user manage an alarm system based on Z-Wave modules. In some embodiments, the alarm system configured under the Modular Alarm 908 may include one or more Z-Wave devices that may control an arbitrary programmable alarm center manager. In such embodiments, one or more of the Z-wave devices may be configured to arm or disarm the alarm system, another of the Z-wave devices may be configured to verify the arming status of the alarm system, and the remaining of the Z-wave devices may be configured to check an alarm state, whether present or absent. In other embodiments, the alarm system may include one Z-wave device that performs arming of the alarm system, verification of the Z-wave devices, and checking to determine if the alarm system has been armed.

An Integrated Alarm Panel 912 may allow a user to integrate or customize one or more third party alarm system with the second home network 200. In some embodiments, any alarm integrated may be fully controlled by the second home network 200. Additionally, items such alarm devices that have been added by integration become elements of the second home network 200. For example, in some embodiments, alarm sensors may be configured to control light switches.

Figure 10:
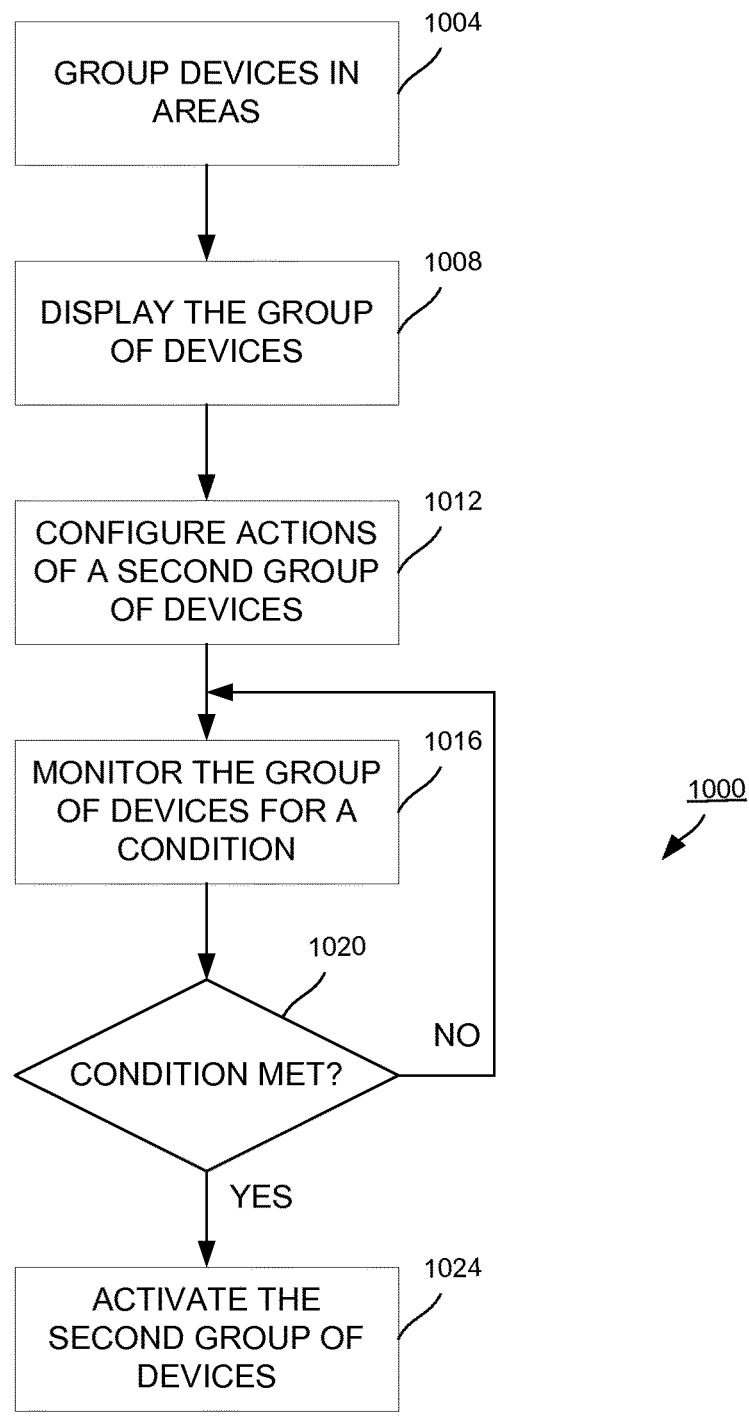
FIG. 10 illustrates an exemplary flow chart for activating one or more alarm actions.

FIG. 10 illustrates an exemplary flow chart 1000 for activating one or more alarm actions based on one or more monitored conditions. In step 1004, the electronic management user-interface 300 uses the home manager 110 to group a number of elements in a predefined area, for example, one or more security devices 120*i* (e.g., a smoke detector, a carbon monoxide detector, a security alarm, a motion detector) and one or more sensors and/or controller (e.g., intelligent motion sensor 120*l* defined in the living room. In step 1008, the electronic management user-interface 300 displays the group of devices available and alarm states of the group of devices. For example, the electronic management user-interface 300 displays that a living room has been armed for an alarm when a condition is met. The electronic management user-interface 300 also prompts a user to arm the area.

In step 1012, the electronic management user-interface 300 prompts the user to configure actions in a scene, for example, the PANIC SCENE, associated with a second group of elements, for example lights and notifications as discussed above. The home manager 110 through the group of selected elements, for example, security devices 120*i* and/or the motion sensor 120*l*, monitors conditions of the selected elements in step 1016. If the conditions are met as determined in step 1020, the electronic management user-interface 300 activates the second group of elements. For example, the electronic management user-interface 300 initiates switching on elements such as the lights, closing the roller blinds, and sending notification to a predefined recipient.

The HEATING panel (FIG. 8) may let a user schedule heating programs at predetermined times. After one or more heating zones have been created, and/or one or more rooms are added to the zones, all elements are responsible for maintaining a desired temperature that works in accordance with a user-defined schedule. Similarly, the COOLING panel 816 may let a user schedule cooling programs at predetermined times. After one or more cooling zones have been created, and/or one or more rooms are added to the zones, one or more elements are responsible for maintaining a desired temperature that works in accordance with schedule. The HUMIDITY panel 820 may let a user schedule cooling programs at predetermined times. After the cooling zones have been created, and/or one or more rooms are added to the zones, one or more elements are responsible for maintaining a desired humidity that works in accordance with schedule.

The SPRINKLER panel 824 may let a user control switches of one or more elements such as sprinklers 120*p*. Particularly, the SPRINKLER panel 824 may be configured by selecting one or more relay switch modules that will control one or more sprinklers, adjusting an amount of water (as a percentage) to be used, optionally adjusting the amount of water or time delay if rain has been detected, selecting a number of cycles per day for sprinklers to operate, selecting operating days of one or more sprinklers, selecting a start hour of every operating cycle, and setting one or more sprinklers to operate automatically based on the aforementioned selections.

Figure 11:
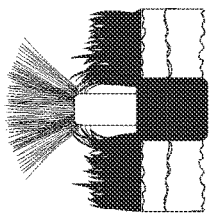
FIG. 11 illustrates an exemplary SPRINKLER panel screen.

An exemplary SPRINKLER panel screen 1100 is illustrated in FIG. 11. The screen 1100 shows an ADJUST WATER window 1104, a RAIN DELAY window 1108, and a CYCLES PER DAY window 1112. The screen 1100 also shows three sprinklers a first sprinkler 1116, a second sprinkler 1120, and a third sprinkler 1124. The first sprinkler 1116 includes a first action button that has been set to off (OFF). The second sprinkler 1120 includes a second action button that has been set to automatic (AUTO). The third sprinkler 1124 includes a third action button that has also been set to automatic (AUTO). In the embodiment shown, the third sprinkler 1124 is set to turn on for 15 minutes at 9:00 am, and for 12 minutes at 9:00 pm on Tuesday and Thursday. Similarly, the second sprinkler 1120 is set to turn on for 12 minutes at 3:31 pm, and for 15 minutes from 8:06 pm on Saturday.

The EVENT panel 828 (FIG. 8) logs, records or registers all activities such as activation of alarms taking place. The EVENT panel 828 may let a user monitor changes in status of all elements and filter the statuses depending on the element type and the time they occurred. The ACCESS CONTROL panel 832 may let a user manage accounts of users, grant or block access to the elements, for example, cameras; scenes and system settings, grant or block access to a given mobile application, set a period for reporting GPS locations from a certain communication device, for example iPhone, and set one or more mobile communication devices to receive notifications. For example, if there is USER 1 in the home network 110, and a room ROOM 1 has already been assigned to the user, the user will be able to manage the room ROOM 1 only through the mobile communication device.

In some embodiments, a user may also configure the ACCESS CONTROL panel 832 to track one or more predefined objects, for example, mobile phones carried by family members. In some embodiments, a user may start a scene via the ACCESS CONTROL panel 832. For example, the user may configure the home network manager 110 of FIG. 2 to predefine and register one or more objects, for example, mobile devices and/or tags, carried by family members through a plurality of object identifications (such as operating systems used by the objects), notification messages, confirmations, emails, and messages. In some embodiments, after the objects have been predefined or registered with the home network manager, an authorized user may define a reporting period and configure the home network manager and/or the objects to receive push notification. For example, in some embodiments, the user may then define a time when the tracking starts. For example, the user may start reporting his own location or movements when he is about to leave work such that the home network manager may regulate the temperature within the home to a certain predefined degree through activating an air-conditioning unit or a heating device. For another example, the user may start tracking a predefined object continuously. For yet another example, the user may start tracking a predefined object carried by a family member only at a particular time of the day such as during school hours.

The NOTIFICATION panel 840 may let a user create messages to be used for informing the user of certain events taking place in the second location 201. The LOCALIZATION panel 844 uses a user-defined GPS points to activate GPS scenes. In some embodiments, GPS points are defined by choosing coordinates on a map, or entering certain GPS coordinates. For example, after a user (USER 1) has defined two GPS points—a HOME location and a WORK location, the user (USER 1) may create a scene that turns off all the lights in the home once the user (USER 1) leaves the HOME location, and that arms any alarm at home once the user enters the WORK location.

The LINKED panel 848 may allow a user to select a plurality of elements and combine the selected elements into one element, such that the electronic management user-interface 300 may control the selected elements one single device. In some embodiments, the single device will be displayed in the electronic management user-interface 300 as a single device. In the embodiment as shown, the LINKED panel 848 includes four different LINKED subpanels: a heating subpanel, an air conditioning subpanel, a humidity subpanel, and a video gate subpanel. In some embodiments, the heating subpanel enables linking between relay switch modules and temperature sensors. The link thus may be used to control boilers, floor heating, Jacuzzis, and swimming pools. The air conditioning subpanel uses on the same principle as heating linked devices such that a user may add multiple switches turning several air conditioning devices ON or OFF, so that air conditioning in multiple rooms or sections may be operated as a single device. After air conditioning linked devices has been created, managing and scheduling is done by the use of the air conditioning subpanel.

The VoIP panel 852 sets the home network manager as a voice over IP (VoIP) server. The VoIP server may let a user configure any number of elements to support voice and video calls.

Referring back to FIG. 3, the CONFIGURATION TAB 314 may allow a user to configure settings of the home network 110 and/or the electronic management user-interface 300.

Figure 12:
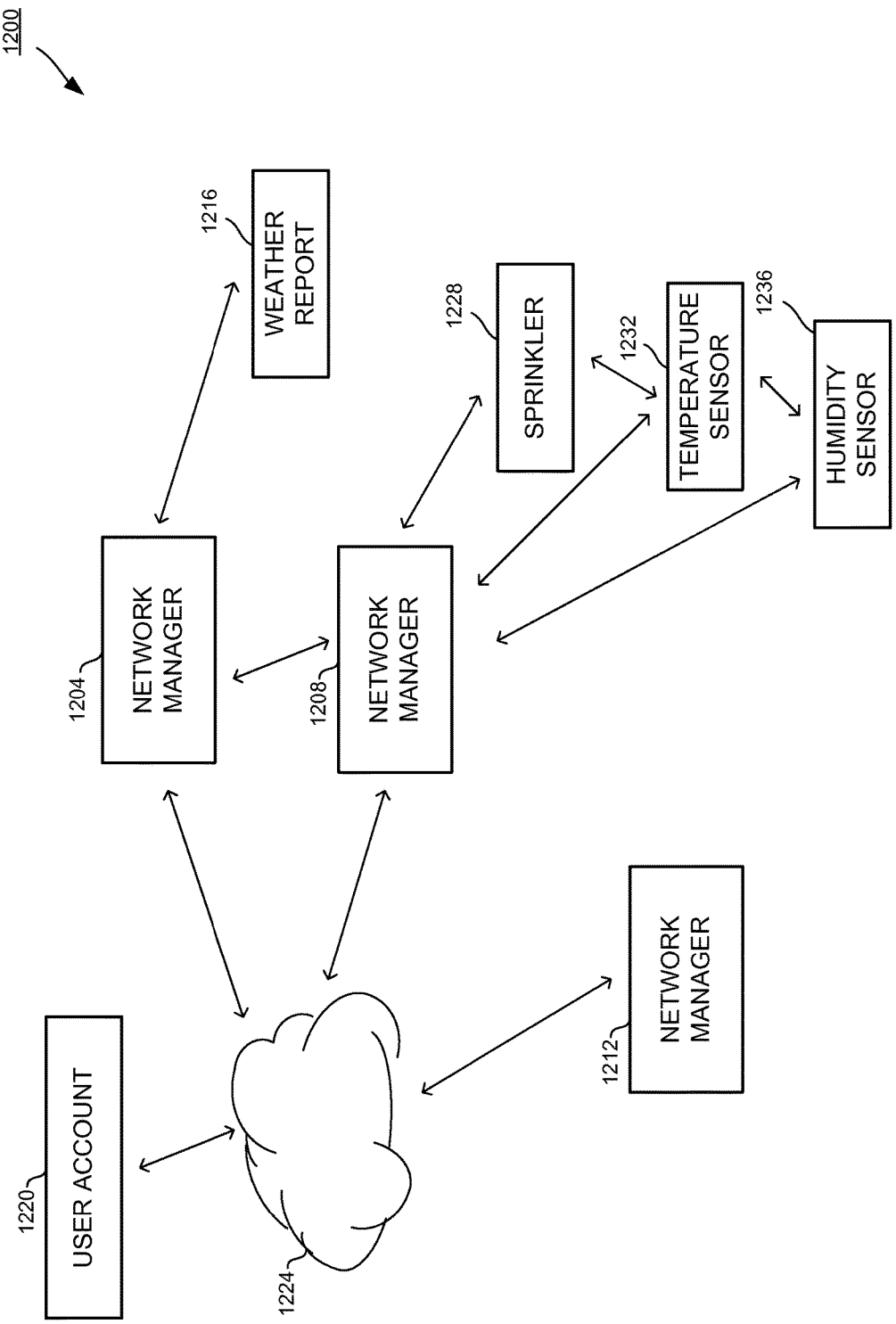
FIG. 12 illustrates an exemplary network with associated devices.

In some embodiments, the electronic management user-interface 300 may allow a user to associate an element with another element, an element with a network manager, a network manager with another network manager, and/or a combination of all of above. FIG. 12 illustrates an exemplary of such a management network 1200. In the embodiment shown in FIG. 12, the management network 1200 includes a plurality of network managers 1204, 1208, 1212, similar to the home network manager 110 of FIG. 2. In some embodiments, the network manager 1204 may be assigned to manage elements with an area, such as, a first floor or a home office of a home, and is associated with a weather report element 1216 that receives a weather forecast, from sources such as the Internet. The network manager 1208 may be assigned to manage exterior elements of the home, and may associate with the network manager 1204 based on a user account 1220. In some embodiments, a user may access information and control elements associated with the network manager 1204 and the network manager 1208 via the user account 1220, for example, remotely with a tablet (not shown), through a network 1224, such as the Internet, or a cloud. In some embodiments, the network manager 1208 is associated with elements such as a sprinkler controller 1228, a temperature sensor 1232, and a humidity sensor 1236. The network manager 1212 may be assigned to manage elements in an area remote from the home, for example, a work premise. In the embodiment shown in FIG. 12, the network manager 1204 is also associated with the network manager 1208. The network manager 1204 and the network manager 1208 are associated with the network manager 1212 through the network 1224.

In some embodiments, associating different devices and/or managers may allow a user to manage elements using the same user account, for example, similar to the user account 1220. In other embodiments, associating different devices and/or managers may also allow a user to add, upgrade and link different devices and/or different network managers to an existing network manager through the electronic management user-interface 300. In such embodiments, the electronic management user-interface 300 may prompt through the electronic management user-interface 300 to link certain elements, devices, and/or managers managed under the same user account. For example, after creating a user account, a user may configure an existing network of elements and an existing home network manager. Shortly thereafter, the user via the user account may add one or more home network managers, and/or one or more elements or devices within the defined or existing home network manager. Because there may be more than one home network manager under the same user account, a user may simply log on to the user account and see all devices and/or network managers irrespective through which network managers the devices are connected to. In the embodiment shown in FIG. 12, for example, a humidity sensor 1228 and a temperature sensor 1232 with a sprinkler controller 1236 to start and stop grass watering. Alternatively, the user may start and stop grass watering based on the weather report received at the network manager 1208 through the linked network manager 1204. In some embodiments, elements or devices that may be associated include, but are not limited to, thermostat linked with a heating device within a heating zone, a humidity sensor linked with a temperature sensor and/or a sprinkling zone, and the like.

In some embodiments, the home network manager 110 also provides a backup mode and a recovery mode. In the backup mode, the home network manager 110 creates a backup file, which is a copy of a file containing the information with respect to all devices added to the home network manager 110 and their respective settings, users individual settings and an home network manager 110 operating system. When the backup file is retrieved, all settings of the home network manager 110 that have been saved are restored. In some embodiments, the recovery mode is a special panel of the PANEL tab 312 of FIG. 3 designed for retrieving the home network manager operating system in case of technical problems, for example, when it is not possible to log into the home screen 300. Using the recovery mode, the home network manager 110 will be restored to factory installed settings. In some embodiments, the recovery mode operates in such a way that memory accessible by the home network manager 110 is formatted, and disk image from memory location designated for the recovery mode is loaded back on the home network manager 110. In other embodiments, the disk image from memory location designated for the recovery mode is loaded back in a special memory location in the home network manager 110.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a method and a system for operating a home manager user-interface.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

The invention claimed is:

1. A method of operating a system at a premise, wherein the system includes a network manager platform and a plurality of network devices, wherein the method comprises:
   receiving, at the network manager platform, a first user input through a graphical user interface to cause presentation of a group management display;
   receiving, at the network manager platform, a second user input through the graphical user interface while displaying the group management display;
   grouping, by the network manager platform, a first set of the plurality of network devices into a first group based on the second user input;
   receiving, at the network manager platform, a third user input through the graphical user interface while displaying the group management display;
   grouping, by the network manager platform, a second set of the plurality of network devices into a second group based on the third user input;
   receiving, at the network manager platform, a fourth user input through the graphical user interface to cause presentation of a scene programming display;
   receiving, at the network manager platform, a fifth user input through the graphical user interface while displaying the scene programming display;
   adding a programmable scene in response to the fifth user input;
   receiving, at the network manager platform, a sixth user input through the graphical user interface while displaying the scene programming display specifying at least one action to be taken by the second group of network devices, individually;
   receiving, at the network manager platform; a seventh user input through the graphical user interface while displaying the scene programming display specifying a condition of a status of the at least one of the network devices in the first group;
   monitoring, by the network manager platform, the status of the at least one of the network devices in the first group;
   determining; by the network manager platform, whether the status of the at least one of the network devices in the first group satisfies the condition; and
   if the status satisfies the condition, instructing, by the network manager platform, each of the network devices in the second group to take the at least one action.

2. The method of claim 1, wherein the plurality of network devices in the first group are each a same type.

3. The method of claim 1, wherein said monitoring the status of the at least one of the network devices in the first group further comprises determining an alarm status of the at least one of the network devices in the first group.

4. The method of claim 3, further comprising switching the alarm status to an armed state in response to determining that the alarm status is in a disarmed state.

5. The method of claim 1; wherein:
   at least the one of the network devices in the first group comprises a timer;
   at least the one of the network devices in the second group comprises a sprinkler;
   the status of the timer comprises a current time;
   the condition comprises when the current time equals a preset time; and
   the at least one action comprise turning the sprinkler ON.

6. The method of claim 1, wherein:
   at least the one of the network devices in the first group comprises a timer;
   at least the one of the network devices in the second group comprises a sprinkler;
   the status of the timer comprises a current time;
   the condition comprises when the current time equals a preset time; and
   the at least one action comprises turning the sprinkler OFF.

7. The method of claim 1, wherein:
   at least the one of the network devices in the first group comprises a smoke detector;
   at least the one of the network devices in the second group comprises an email module;
   the status of the smoke detector comprises whether or not smoke is detected;
   the condition comprises when smoke is detected; and
   the at least one action comprises emailing a notification via the email module.

8. The method of claim 1; wherein:
   at least the one of the network devices in the first group comprises a smoke detector;
   at least the one of the network devices in the second group comprises a light;
   the status of the smoke detector comprises whether or not smoke is detected;
   the condition comprises when smoke is detected; and
   the at least one action comprises switching the light ON.

* * * * *